United States Patent
Ahne et al.

(10) Patent No.: US 7,126,107 B2
(45) Date of Patent: Oct. 24, 2006

(54) METHODS AND APPARATUSES FOR SENSING ROTATIONAL POSITION OF A COMPONENT IN A PRINTING DEVICE

(75) Inventors: Adam J. Ahne, Lexington, KY (US); Alexander L. Chapman, Lexington, KY (US); Patrick L. Kroger, Lexington, KY (US); Jay W. Vessels, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 155 days.

(21) Appl. No.: 10/389,644

(22) Filed: Mar. 14, 2003

(65) Prior Publication Data

US 2004/0178332 A1    Sep. 16, 2004

(51) Int. Cl.
*G01D 5/34* (2006.01)
*G01J 9/00* (2006.01)

(52) U.S. Cl. ............... 250/231.13; 250/231.17; 341/13; 341/141

(58) Field of Classification Search ......... 250/231.13, 250/231.17, 559.4, 231.14, 559.44; 271/3.14, 271/176; 341/13, 141; 33/1 PT
See application file for complete search history.

(56) References Cited

U.S. PATENT DOCUMENTS

| | | | |
|---|---|---|---|
| 4,489,651 A | 12/1984 | De Luca et al. | |
| 4,591,969 A | 5/1986 | Bloom et al. | |
| 4,646,635 A | 3/1987 | Salazar et al. | |
| 4,687,321 A | 8/1987 | Itoh | |
| 4,712,000 A * | 12/1987 | Yoshikawa et al. | 250/205 |
| 4,766,447 A | 8/1988 | Tsukada | |
| 4,872,773 A | 10/1989 | Ueda | |
| 4,904,330 A | 2/1990 | Vanderpool et al. | |
| 4,983,055 A | 1/1991 | Iwata | |
| 5,243,188 A * | 9/1993 | Hattori et al. | 250/231.17 |
| 5,257,867 A | 11/1993 | Ito et al. | |
| 5,461,484 A | 10/1995 | Orlicki et al. | |
| 5,471,314 A | 11/1995 | Orlicki et al. | |
| 5,575,575 A | 11/1996 | Ide et al. | |
| 5,634,169 A | 5/1997 | Barry et al. | |
| 5,665,193 A | 9/1997 | Groswith, III et al. | |
| 5,676,366 A * | 10/1997 | Polidoro | 271/176 |
| 5,768,661 A | 6/1998 | Coffey et al. | |
| 5,805,288 A | 9/1998 | Simmons et al. | |
| 5,837,999 A * | 11/1998 | Horiuchi | 250/231.14 |
| 5,988,061 A | 11/1999 | Kagawa | |
| 6,020,907 A | 2/2000 | Fassler et al. | |
| 6,102,519 A | 8/2000 | Yasui et al. | |
| 6,193,350 B1 | 2/2001 | Hadley | |
| 6,386,772 B1 | 5/2002 | Klinefelter et al. | |
| 6,428,224 B1 | 8/2002 | Askren et al. | |

* cited by examiner

*Primary Examiner*—Stephone B. Allen
*Assistant Examiner*—Patrick J. Lee
(74) *Attorney, Agent, or Firm*—John Harmeyer

(57) ABSTRACT

An encoder and related methods for use in a printing device indexing system are provided. In some embodiments, the system comprises a feedroller or other component configured to index media through a printing device, and an encoder disk is coupled to the feedroller. In these embodiments, the system includes a reflective optical detector having a transmitter and a receiver provided adjacent a first surface of the encoder disk, the reflective optical detector being configured to detect the passage of the home position mark as the encoder disk rotates by the reflection of radiation off of the first surface. Also provided in some embodiments are methods for setting a counter to correspond with the home position of a rotatable element by utilizing threshold signal levels.

14 Claims, 15 Drawing Sheets

Example Compensation Map/Table: 302

Periodic Error Compensation Factor 304

| once-per-rev position (2400ths) | adjustment (fine units) |
|---|---|
| 0 | 0 |
| 102 | 392 |
| 204 | 724 |
| 306 | 946 |
| 408 | 1024 |
| 510 | 946 |
| 612 | 724 |
| 714 | 392 |
| 816 | 0 |
| 918 | -392 |
| 1020 | -724 |
| 1122 | -946 |
| 1224 | -1024 |
| 1326 | -946 |
| 1428 | -724 |
| 1530 | -392 |
| 1632 | 0 |

300

Feedrate compensation factor

X %

306

METHODS AND APPARATUSES FOR SENSING ROTATIONAL POSITION OF A COMPONENT IN A PRINTING DEVICE

RELATED APPLICATIONS

This application is related to U.S. patent application Ser. No. 10/389,576 filed on Mar. 14, 2003 and entitled "Methods and Systems to Calibrate Media Indexing Errors in a Printing Device", and to U.S. patent application Ser. No. 10/389,052 filed on Mar. 14, 2003 and entitled "Methods and Systems for Compensation of Media Indexing Errors in a Printing Device".

TECHNICAL FIELD

The present invention relates generally to printing devices and, in some embodiments, to methods and apparatuses for sensing position of a media indexing component in such printing devices.

BACKGROUND OF THE INVENTION

In printing devices, a media indexing system advances or indexes the media through the print zone during the printing process. Such systems can include motors, gears, rollers, sensors, and other components that work in conjunction to move the media incrementally. During each incremental movement of the media, a printing element, such as a print head, causes text and/or images to be applied to the media in rows or swaths.

However, manufacturing tolerances, assembly variations, and other imperfections in such indexing components can cause discrepancies between the desired or expected position of the media and the actual position which is realized. For example, one typical component in a media indexing system is a feedroll or feedroller which contacts the media and forces the media through the printing device. Manufacturing tolerances can cause the feedroller diameter to deviate from its ideal diameter and can also cause the feedroller circumference to deviate from its ideal circular shape. The deviation of the actual feedroller diameter from the ideal feedroller diameter can produce a cumulative feedrate error which corresponds to the average deviation in the desired media position during the movement. For example if the diameter is smaller than ideal, "runout" (feedrate) errors will occur causing the media to be underfed. In addition, a deviation of the actual feedroller shape from the ideal circular shape and/or a deviation of the axis of rotation from center, can produce irregular rotation and a substantially sinusoidal "once-per-revolution" (eccentricity) errors in the indexing of the media.

Other similar deviations in other indexing components can also introduce such errors in the indexing of the print receiving media. For example, eccentricity in the encoder wheel used to sense the feedroller position as well as various forces on the media being moved can cause the media to be advanced too little or too much. Such errors can vary within a printing device based upon the media type, environmental factors (such as temperature and humidity), and mechanism wear.

These media positioning errors can result in an undesirable appearance of the printed image. For example, indexing the media too far (i.e., overfeeding the media) might result in a gap or blank band between print swaths, while indexing the media too little (i.e., underfeeding the media) might result in overlapping print swaths that could create dark horizontal bands in the resulting image. Such swath misplacements can be particularly noticeable during particular printing modes or resolutions.

To compensate for such errors, media indexing calibration and compensation control systems and methods can be utilized. Such systems and methods can measure the system error and provide corresponding compensation to media indexing system components, to attempt to increase media positioning accuracy.

In many printing device media indexing systems where such compensation is utilized, encoders are utilized to sense the position of the feedroll or other rotational components within the system. An encoder includes a wheel having incrementally spaced marks which rotates with the rotational component being measured. An optical sensor detects the marks as they pass and the detection of each mark can be counted to keep track of the incremental movement of the wheel and, therefore, the movement of the component. However, in order to compensate for media indexing errors which are dependent upon the rotational position of the component, the encoder can be required to monitor the rotational or angular position of the component. To achieve this result, a home position mark or index mark could be provided on the encoder wheel, such that the encoder can sense when the wheel has reached a home position. However, some configurations of home position encoders can require increased manufacturing cost and space, while others can be error prone.

Accordingly, it is desirable to provide an improved printing device encoder with efficient and accurate home position locating capability. Such an improved encoder can be utilized in media positioning compensation or other rotational sensing needs within the printing device.

SUMMARY OF THE INVENTION

Accordingly, it is an advantage of at least one embodiment of the invention to provide improved home position detecting encoders for printing devices.

According to one embodiment, an indexing system for indexing media in a printing device is provided. The system of this embodiment comprises a moveable component configured to index media through a printing device, and an encoder disk coupled to the component and having a number of incremental marks spaced thereon and a home position mark located thereon. The system further includes a reflective optical detector having a transmitter and a receiver provided adjacent a surface of the encoder disk. The reflective optical detector is configured to detect the passage of at least one of the home position mark and the incremental marks as the encoder disk rotates by the reflection of radiation off of the surface.

In another embodiment, an indexing system is provided for indexing media in a printing device, the system comprising a moveable component configured to index media through a printing device, and an encoder disk coupled to the component and having a number of incremental marks spaced thereon and a home position mark located thereon. The system further comprises a reflective optical detector having a transmitter and a receiver provided adjacent a surface of the encoder disk, the reflective optical detector being configured to detect the passage of the home position mark as the encoder disk rotates by the reflection of radiation off of the surface. In addition, the system comprises a transmissive optical detector having a transmitter and receiver spaced on opposite sides of the encoder disk, the transmissive optical detector being configured to detect the passage of the incremental marks as the encoder disk rotates by the transmission of radiation through the encoder disk.

According to another embodiment, a method is provided for locating a home position of a rotatable element. The method comprises rotating the rotatable element and an encoder disk coupled to the rotatable element, and monitoring signals from a home position detector configured to detect a home position mark on the encoder disk. The method further comprises determining a threshold level based upon the signals from the home position detector, and identifying when the signal reaches the threshold level. In some such embodiments, the rotation is stopped once the home position signal reaches the threshold.

BRIEF DESCRIPTION OF THE DRAWINGS

While the specification concludes with claims particularly pointing out and distinctly claiming the invention, it is believed that the invention will be better understood from the following description of illustrative embodiments in conjunction with the associated drawings, in which like reference numerals indicate corresponding structures throughout the views and in which:

FIG. 11a is an illustrative table having examples of compensation factors that can be stored in memory in a media indexing control system, according to principles of the present inventions;

FIG. 11b is a graph presenting the illustrative data of FIG. 11a;

DETAILED DESCRIPTION OF THE ILLUSTRATIVE EMBODIMENTS

Figure 1:
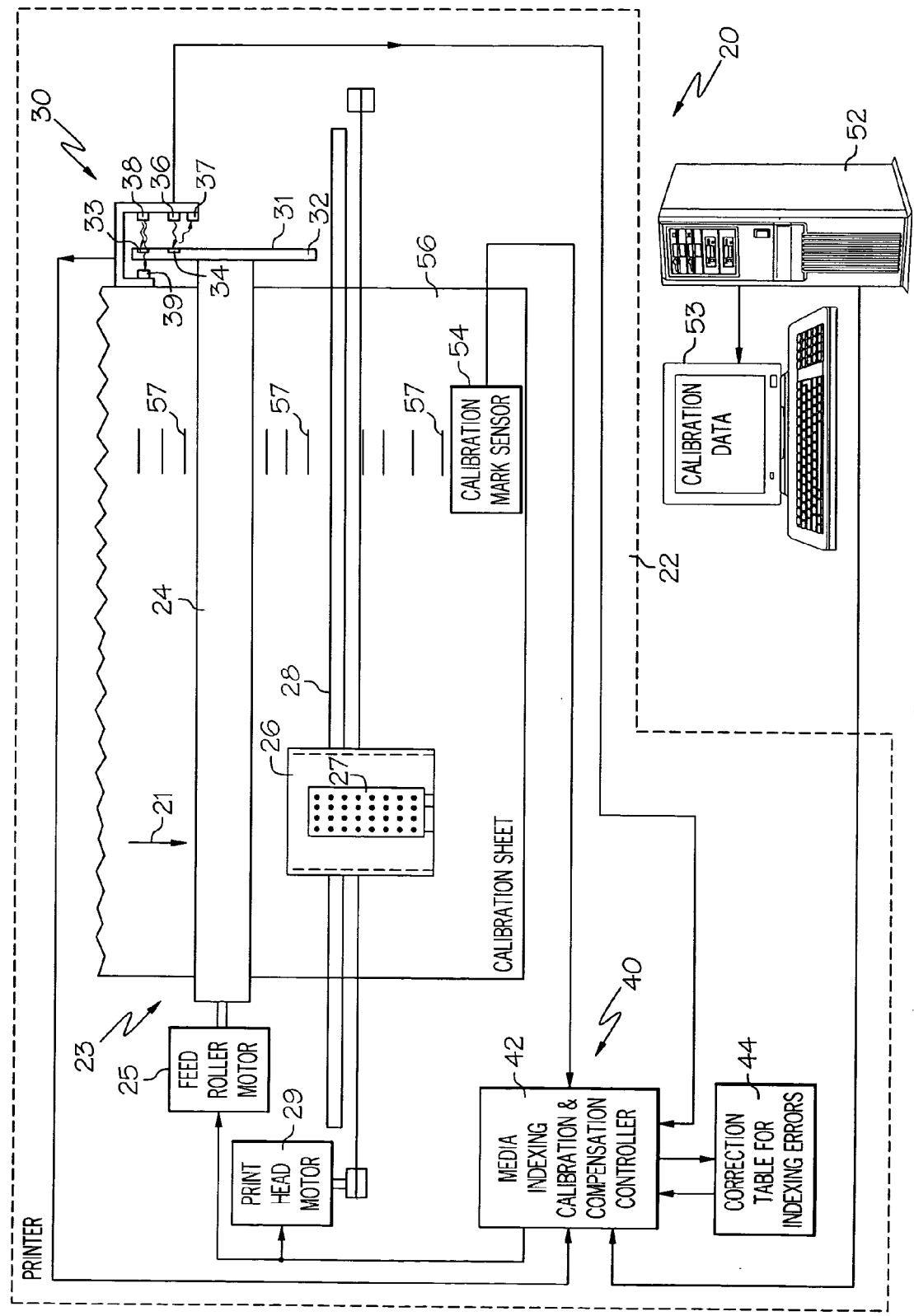
FIG. 1 is a schematic plan view of a printer having a media indexing calibration and a corresponding media indexing compensation system, made and operating according to principles of the present inventions.

Aspects and principles of the present inventions will now be described relative to various illustrative embodiments. Some such embodiments relate to improved media indexing in printing devices, such as printers, and in particular to improved systems and methods for calibration of media indexing errors and compensation of such errors during printing. In some embodiments, error data is derived based upon the actual positions of the media and the expected positions of the media and the parameters of a line that best fits the error data are calculated. The parameters of the line can then be used to determine a feedrate compensation factor which can be stored for use in compensating for cumulative errors during printing. The parameters of a periodic function that best fits the periodic component of the error data can also be determined and used for compensation of recurring errors (i.e., eccentricity or once-per-revolution errors) during media indexing.

In some embodiments, it can be determined whether the error data best fits the periodic function having the calculated parameters or whether the error data best fits an ideal function having an adjusted parameter which is based upon the calculated parameter. In one embodiment, the parameter may comprise a phase and the ideal function may comprise a sine function. The parameters (e.g., the phase and amplitude of the sine function) can be used to populate a compensation table for use in compensation of the media indexing once-per-revolution errors in a printer. Moreover, if the maximum value of the periodic error data exceeds a threshold, then an error condition can be indicated.

The error data can be acquired in some embodiments by sensing the position of marks on the calibration media and acquiring corresponding signals from a rotational sensor (e.g., an encoder) which senses the position of a feedroller, and then calculating at least one threshold from the acquired signals. The edges of the calibration marks can be determined by comparing the signals which are acquired to at least one threshold, and a center rotational sensor value for the center of the calibration mark can be established by averaging the rotational sensor values at the edges which are determined. The rotational sensor value for the mark can then be used to determine error position data for the mark.

In some embodiments, a predetermined compensation factor is selected based upon the range in which the measured media indexing error falls and the selected factor is then utilized to compensate for media indexing errors during printing. Moreover, it can be determined whether a predetermined printing mode is selected (e.g., as identified by a driver) and if the mode is selected, a compensation factor is applied in order to compensate for media indexing errors, but the compensation factor is not applied if the printing mode is not selected. The printing mode may comprise, for example, media type, print speed, number of print passes, or print resolution.

In one embodiment, a compensation factor may be applied in modes where the error per index move is likely to be greater than any effect of possible errors associated with the mapping procedure. For example, a compensation factor may be applied in only those modes where large index moves are used, such as with those modes that use a relatively lower number of printhead passes to print a page. In modes that use a relatively higher number of passes, the possible errors due to the mapping procedure may lead to undesireable print defects, and the error from the feedroll may be more easily hidden with multiple passes anyway.

Once the compensation factors have been determined by these or other like methods, a media indexing compensation control system can be utilized within the printer to then compensate for the cumulative feedrate errors and the once-per-revolution errors, according to other aspects and embodiments of the inventions. In some embodiments, the compensation control system operates a compensation method in which an ideal indexing command is adjusted based upon a compensation factor one time for each desired indexing movement in order to print at the next location for the image being printed. The adjusted ideal indexing command then moves a roller and/or other component to index the receiving media by the desired amount in order to print at the next location for the image being printed. According to one embodiment, the indexing command is adjusted by the feedrate scaling factor and the once-per-revolution compensation factor, and the final indexing command is then utilized along with feedback from the roller to control the roller without further adjustment to the command. In some embodiments, it can be determined whether a home position sensor for identifying the roller home position is operational. If the home position sensor is operational, the once-per-revolution compensation is applied to the indexing command, but if the home position sensor is not operational, the once-per-revolution compensation is not applied. Moreover, in some embodiments, the home position on the sensor can be periodically located and the corresponding value of a home position counter identified. The counter is reset if its value deviates from an expected value by a predetermined amount, the expected value being that which would be expected for each rotation of the sensor to the home position.

Still other illustrative embodiments relate to a home position sensor which can be utilized in media indexing compensation as well as for other uses. In one embodiment, an encoder disk includes a number of incremental marks and a home position mark. In this embodiment, a transmissive optical detector is provided which includes a transmitter and receiver spaced on opposite sides of the encoder disk. The transmissive optical detector detects the passage of incremental marks as the encoder disk rotates, by the transmission of radiation through the encoder disk. A reflective optical detector is also provided in this embodiment and includes a transmitter and receiver provided adjacent a first surface of the encoder disk. The reflective optical detector is configured to detect the passage of the home position mark as the encoder disk rotates through the reflection of radiation off the surface. In accordance with another embodiment, a method is provided for moving a rotatable component to a home position. During rotation, signals from a home position detector are monitored, and a threshold level based upon the signals from the home position detector is determined. The rotatable component is rotated at least until a signal from the home position detector reaches the threshold level, at which point a counter is set.

Additional embodiments relate to a special-purpose calibration media for use in calibrating the media indexing errors of the printer. According to one illustrative embodiment, the calibration media includes a plastic material that is conductive and has a plurality of calibration marks. The contrast of the calibration marks with respect to the surrounding areas is at least ten percent. According to other embodiments, the media comprises a sheet having a printed area which includes a vertical column of calibration marks and an unprinted area, the printed area and unprinted area being sized and located such that printer media rollers only contact the unprinted area as the printed area of the sheet passes the optical sensor of the printer, such that the calibration marks are not worn off by contact with the rollers. In some embodiments, the media can include an unprinted area having a top margin and a bottom margin sized such that printer media entrance rollers and exit rollers both remain in contact with the sheet during the entire time that the calibration marks pass the optical sensor of the printer.

These various illustrative embodiments, and the principles of the inventions illustrated by these embodiments, will be better understood from the following more detailed descriptions. More specifically, FIG. 1 is a schematic plan view of a system 20 for calibration of media indexing errors in a printer 22 as well as for compensation of those errors during printing by the printer. In particular, the system 20 includes a calibration and compensation system 40 which is included in the printer 22. The calibration functions of the system 40 acquire sensor data from the printer 22 and determine compensation factors for compensation of the detected indexing errors. The compensation functions of the system 40 then utilize the calculated factors to control the indexing of media through the printer 22 and to compensate for the errors in the media indexing system of the printer.

The printer 22 includes mechanical and electrical systems for depositing a printing substance, such as ink, toner, or the like, onto a print receiving medium, such as paper, transparencies, or other media. Accordingly, the printer 22 may comprise an ink jet printer, a laser printer, a plotter, or other marking device, and therefore may include any of a variety of components needed or desired for such printing purposes.

In this illustrative embodiment, the printer 22 includes a media indexing system 23 for advancing or indexing the print receiving media in the direction of arrow 21 such that the printing substance may be deposited on the media as the media is moved through the printer. In this embodiment, the media indexing system 23 includes a feedroller 24 driven by a motor 25. Accordingly, the print receiving medium can be fed into a nip between the feedroller 24 and a backup roller, whereby the medium is placed in contact with the feedroller by the backup roller to allow the medium to be driven by the outer surface of the roller 24. For example, the medium can be held in pressure contact with the feedroller 24 by a series of backup rollers that are biased (e.g., spring-loaded) against the feedroller. The feedroller 24 may be formed from any a variety of suitable materials, and may comprise, for example, a rubber-coated or thermal spray-coated steel shaft. The feedroller 24 may comprise a series of rollers, but in this illustrative embodiment comprises a single seamless concentric roller having an effective radius. However, manufacturing tolerances may cause deviations in the expected radius size and circular shape of the roller 24 which can result in corresponding deviations between the actual and expected distances that the medium moves for a given angular rotation of the roller 24. Accordingly, as will be described in further detail below, the calibration system can be utilized to detect such errors and the compensation system can be utilized to compensate for these errors.

The feedroller 24 may be driven by a suitable actuator, such as a drive motor 25 which may comprise a DC servomotor or a stepper motor. The motor 25 can be directly coupled to the feedroller 24 or it can be coupled via a suitable gear system or transmission system. The motor 25 can be controlled by a controller 42 which can include appropriate motor drive circuitry which applies the media indexing compensation.

The printer 22 also includes a printhead assembly 26 which includes a printhead 27 movable along a guide rod 28 under the power of a printhead motor 29 which is coupled to the printhead assembly 26. Printhead 27 includes nozzles or other openings for allowing the printing substance to be deposited on the media as the media is advanced passed the printhead assembly 26. The lateral movement of the printhead assembly under the power of the motor 29 in combination with the longitudinal movement of the media by the indexing system 23 allows for the incremental printing of text or images at various locations on the medium. However, components other than the illustrative components shown may be utilized for advancement of the media and application of the print substance. In this illustrative embodiment, the printhead assembly 26 and motor 29 may comprise typical components utilized in an ink jet printer. The printhead motor 29 is controlled by controller circuitry 42 which in this embodiment is shown as integrated with the compensation controller, although such circuitry may be provided separately if desired.

In this illustrative embodiment, the controller 42 controls the feedroller motor 25 in order to advance the print medium through the printer by corresponding movement of the feedroller 24. In addition, the controller also controls the printhead motor 29 in order to move the printhead assembly 26 across the media. The resulting longitudinal movement of the medium and lateral movement of printhead allow for the application of the printing substance at any location on the medium. The controller 42 (or a separate controller) controls the firing of the various nozzles in the printhead 27 to cause the ink to be applied to the medium during this controlled movement of the print head assembly 26 and the print medium via roller 24, such as in an ink jet printing process. The controller 42 may comprise any appropriate circuitry, processor, integrated circuits, firmware, memory, and/or software for performing such control. Illustrative embodiments of such circuitry and other components for conducting ink jet printing in this manner can be found in U.S. Pat. No. 6,431,677, the entire disclosure of which is hereby incorporated herein by reference.

In order to detect how far the feedroller 24 has advanced, and therefore to know the corresponding position of the medium as it is moved through the printer, a rotational sensor such as an encoder 30 may be utilized. The sensed position of the roller 24 is provided by the encoder 30 to the controller 42. Knowing the position of the roller 24 (or the amount of movement of the roller 24), the controller 42 may calculate an estimate of the amount of corresponding advancement of the medium through the printer. If the components of the indexing system 23 were perfect, indexing of the feedroller 24 in the direction of the arrow 21 should result in indexing of the print receiving medium by an amount which linearly corresponds to the amount of rotation of the feedroller (and which can be calculated by knowledge of the circumference of the feedroller). However, as previously mentioned, because of cumulative effects of tolerances associated with the components in the indexing system (e.g., variances from the ideal circumference, configuration, and/or shape of the feedroller), a perfect linear relationship usually does not exist between operation of the indexing system and resulting indexing of the print receiving medium.

Accordingly, the controller 42 in this embodiment utilizes correction factors stored in a correction table 44 in order to compensate for such errors. The correction factors have been determined by the controller 42 during a calibration process which determines the error between the amount of rotation of the feedroller 24 and the resulting movement of the medium through the printer. In particular, as will be described in greater detail below, a calibration media 56 having calibration marks 57 is fed through the printer during the calibration process. A calibration mark sensor 54, such as an optical sensor for example, detects the presence of the marks 57 on the calibration media 56 as the medium is moved through the printer during this calibration process. At the same time, the position of the feedroller 24 is detected by the encoder 30. The data from these two sensors 30 and 54 is fed to the controller 42, or to a computer or other suitable processing circuitry, which then determines the amount of error between the expected position of the medium 56, as determined by the position of the feedroller 24 by the encoder 30, and the actual position of the medium, as determined by the calibration mark sensor 54 and the knowledge of the actual position of the marks 57 on the calibration media 56.

As will be described in greater detail below, both an overall (persistent or cumulative) feedrate error can be calculated by the computer 52 as well as a once-per-revolution (periodic or recurring) error. The feedrate error corresponds to an average amount of error between the actual and the expected positions regardless of the position of the feedroller 24. The once-per-revolution error corresponds to the periodically recurring error which varies dependent upon the rotational position of the feedroller 24. For instance, such errors can be sinusoidal or alternating in nature and may be caused by eccentricity in the encoder disk 32 or feedroller 24. Both such errors can result in an underfeeding or an overfeeding of the media, depending on the particular printer and its components.

If desired, the acquired data, the detected errors, and the calculated compensation factors can be provided to a computer 52 and to a screen 53 during a factory calibration process for viewing by an operator. The operator can then determine whether the calibration process was conducted properly and, if so, can cause the data to be loaded into a correction table memory unit 44 for use by the controller 42 during printing for compensation of the errors. The operator can also use the computer 52 to initiate the calibration process by providing a calibration command to the controller 42 which can then carry out the calibration. In an alternative embodiment, the computer 52 can carry out the calibration process itself by receiving and processing the data from the sensors 54 and 30 while the media 56 is fed through the printer 22 without compensation by the controller 42.

In this illustrative embodiment, the encoder 30 includes a disk 32 having a number of incremental marks 33 about its circumference as well as a single home position mark 34 inward from its edge. The incremental marks 33 are spaced a known distance around the substantially circular edge of the disk 32 and are utilized for detection of incremental movements of the disk and therefore corresponding movements of the feedroller 24. The home position mark 34, on the other hand, is utilized for detection of each complete rotation of the disk 32 and connected to feedroller 24. Accordingly, by detecting both incremental movement of the feedroller 24 via mark 33 as well as a home position via mark 34, the absolute rotational position of the disk 32 and connected feedroller 24 can be known.

The encoder disk 32 can comprise any suitable disk or opto-interrupter disk having transparent portions between the incremental marks 33 so as to allow optical radiation to pass through the disk between these marks. For example, the encoder disk 32 may include sufficient spacing between marks to allow for about 2400 distinctive indexing locations within each inch of corresponding media movement. The transparent portions between the marks define a window through which optical radiation may pass. In this example, the encoder 30 includes a transmissive optical detector comprising a source 38 and a detector 39 spaced adjacent opposite surfaces of the encoder disk 32. The source 38 transmits radiation such as visible light toward the encoder disk 32 and this radiation is either blocked by an incremental mark 33 or allowed to pass through a window depending on the position of the encoder disk 32. If the radiation is blocked by the incremental marks 33, then radiation is not detected at the detector 39, but if the radiation is allowed to pass through the disk 32 at other positions then the radiation will be detected at the detector 39. Accordingly, the detector 39 produces pulses as the encoder disk 32 rotates along with corresponding rotation of the feedroller 24.

Similarly, a reflective optical detector is included with the encoder 30 of this embodiment to detect the passage of the home position or the index mark 34. In particular, the reflective detector in this example includes a radiation source 36 and a radiation detector 37 which are spaced on the same side of the encoder disk 32 adjacent one another. Because the source 36 and the detector 37 utilize a reflective method for detection of the mark 34, these components can be mounted on the same side of the encoder disk, such as on a printed circuit board. The energy from the source 36 is reflected off of the sheen on the surface of the encoder disk 32 such as by sending the radiation from the source 36 toward the disk 32 at an angle rather than transmitting the radiation in a normal direction with respect to the disk. When the home position mark 34 moves past the radiation which is being transmitted by the source 36, this dark mark absorbs the energy causing a signal change on the detector 37 which can then be used to set the home position or index position of the feedroller 24. The radiation from the source 36 can be focused toward the disk 32 to allow for the reflection of the energy. Thus, at times when the mark 34 is not in the home position location, the radiation reflects off of the smooth surface 31 and is detected by the detector 37. However, when the mark 34 is in the home position, it absorbs the radiation from the source 36 thereby causing a change in the output of the detector 37 and thus causing an indication that the home position or index position of the encoder disk and corresponding feedroller 24 has been reached.

While a single detector 39 is shown in the example in FIG. 1, it should be understood that two such detectors could be spaced on this side of the encoder disk 32 at a 90° relationship in order to produce a quadrature signal. Therefore, the radiation from the source 38 transmits through the disk 32 onto the two detectors which produce a quadrature signal which indicates the incremental movement of the disk 32 and also the direction of that movement. The output of the detectors is translated to a count that can be used by the controller 42 as well as the calibration computer 52 in determining the position of the feedroller 24.

By utilization of the home position mark 34, the encoder can also indicate the absolute position of the feedroller 24 and not just incremental or relative movement of the feedroller. Moreover, because a reflective detector is utilized in this embodiment for detection of the home position mark 34, the components of this detector can be placed on the same side of the encoder wheel 32 thereby providing manufacturing advantages as well as reducing the likelihood of interference with the incremental detector 39.

In operation, the printer 22 is calibrated (e.g., at the factory) by feeding a calibration media 56 through the indexing system 23 by rotation of the feedroller motor 25 under control of the controller 42. The marks 57 on the calibration media 56 are at a known-distance and are sensed by the calibration mark sensor 54 as the calibration media is fed through the system 23. Simultaneously, data representing the position of the feedroller 24 is sensed by the encoder 30. The data from the calibration mark sensor 54 and from the encoder 30 is fed to the controller 42 which executes an algorithm to acquire the data and to determine a feedrate compensation factor and once-per-revolution compensation factors (in a correction table) from the data acquired. The correction table and compensation factors are loaded into memory 44 for use by the controller 42 during actual use of the printer 22 for compensation of media indexing errors. More specifically, the controller 42 uses the data stored in memory 44 to compensate the commands fed to the feedroller motor 25 in order to modify the position that would otherwise be reached by the feedroller 24 and to thereby correct for media advancement errors during printing. Various inventive aspects of algorithms that can be used by the controller 42 for compensation as well as inventive aspects of algorithms that can be used by the controller 42 for calibration will be described in further detail in the examples below.

Figure 2:
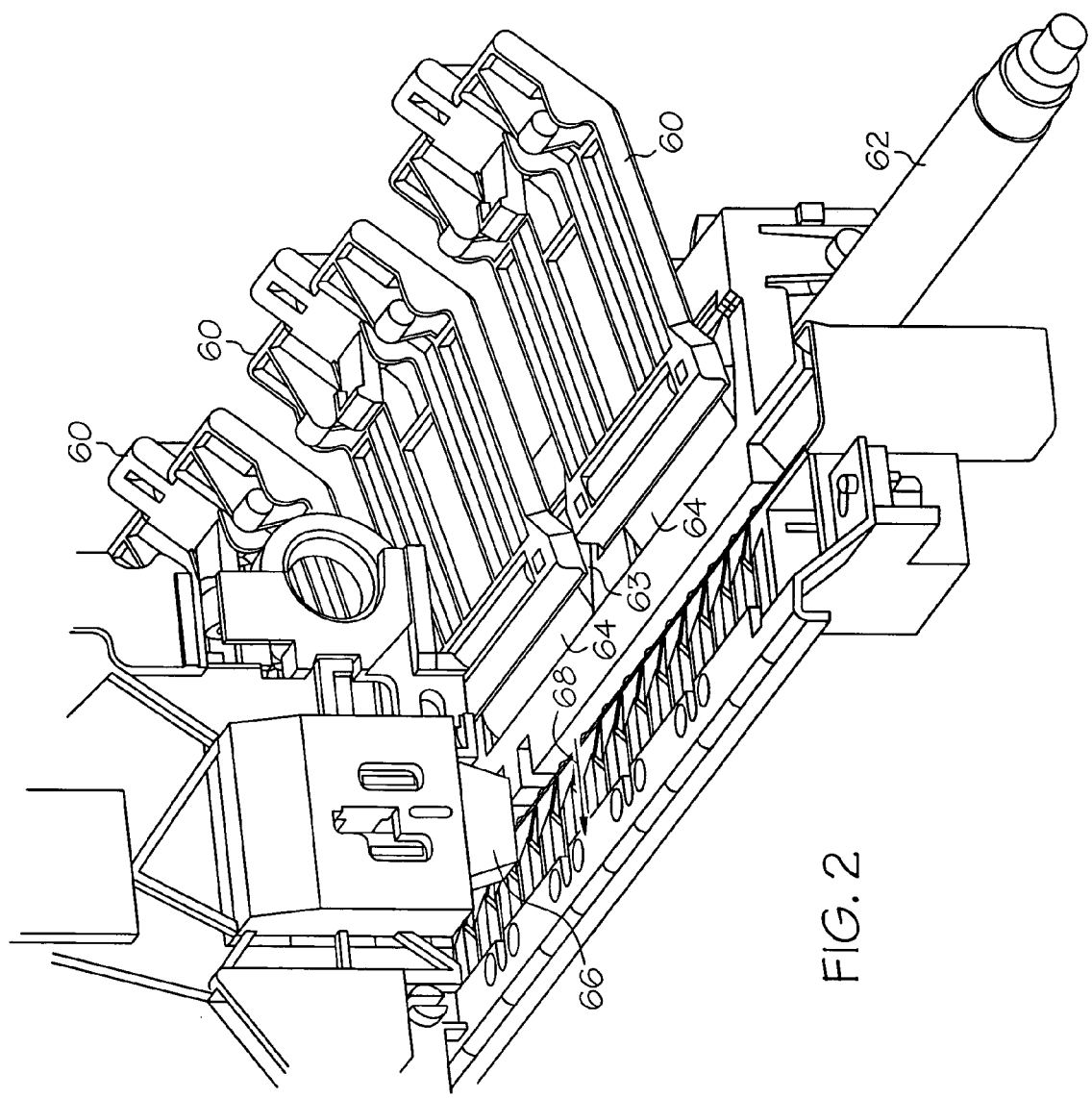
FIG. 2 is a perspective view of a portion of a printer depicting illustrative media indexing components that can be utilized in the media indexing calibration and compensation systems discussed herein and having aspects of the present inventions.
Figure 3:
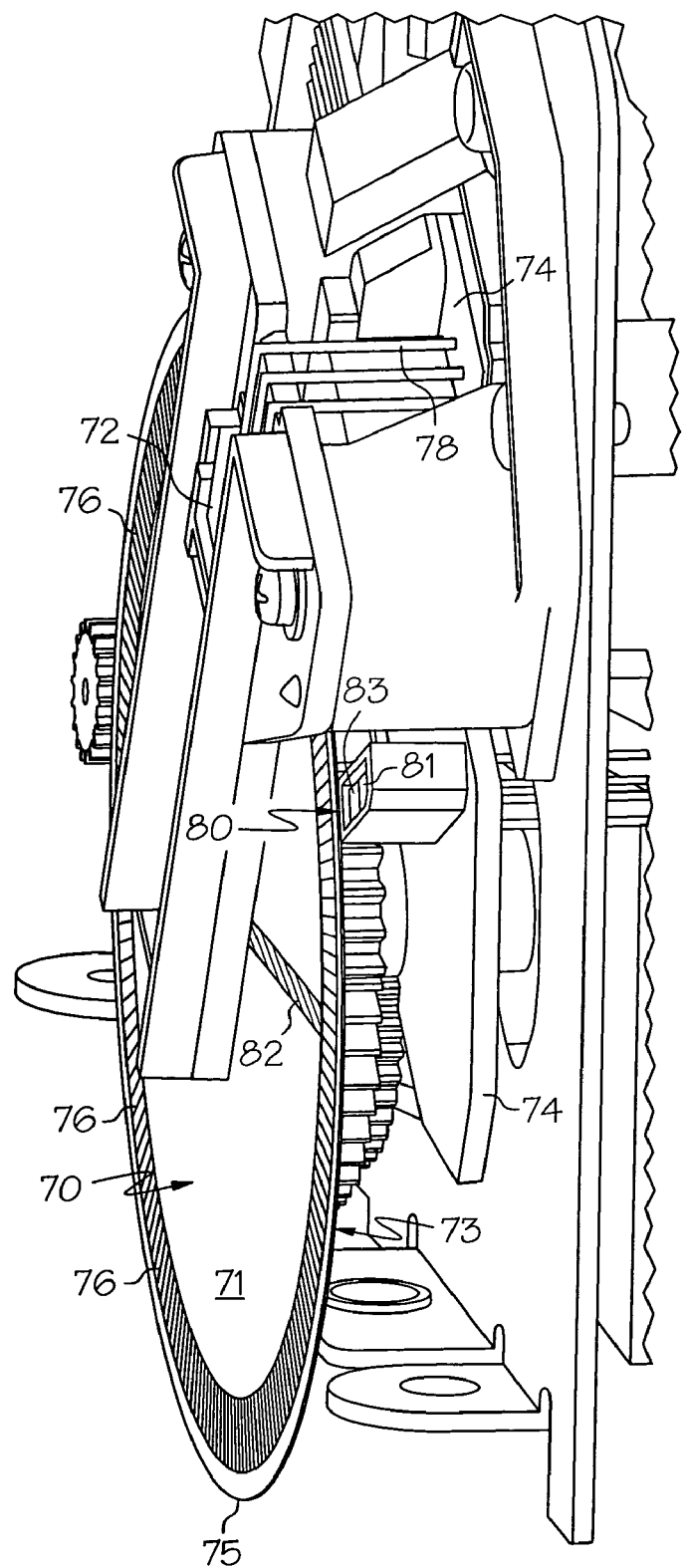
FIG. 3 is a perspective view of a portion of a printer depicting an illustrative encoder which can be used with the embodiments disclosed herein and which is made and operating according to principles of the present inventions.

FIG. 2 and FIG. 3 depict illustrative components that can be used in the printer 22 of FIG. 1. In the illustrative embodiment of FIG. 2, pressure roll arms 60 apply force on the calibration media (as well as the printing medium used during printing) to keep the media in contact with the feedroller. In this embodiment, the feedroller comprises multiple rollers 64 which are driven by a shaft 62 connected to a motor (not shown). In this illustrative embodiment, a clearance 63 is provided between each feedroller 64 as well as between each pressure roll arm 60 corresponding to each feedroller 64. Accordingly, the clearance area 63 between the roll arm 60 and between the rollers 64 ensure that portions of the media fed through the system are not contacted by the roll arms or by the rollers. The calibration media can then be correspondingly configured such that the calibration marks on the media are provided at these clearance locations 63. Accordingly, the same calibration media can be used multiple times for calibrating the printer and yet the wear on the calibration marks will be kept to a minimum since they will not contact the pressure roll arms 60 or the rollers 64. Because the calibration media can be a custom made sheet made from high quality material, it can be expensive. Therefore, reducing wear on such media can prolong its life and thereby reduce costs of the calibration method.

FIG. 2 also shows an illustrative embodiment of a calibration mark sensor 66. In this example, the calibration mark sensor 66 comprises an automatic alignment sensor for aligning the nozzles of the printhead. Accordingly, in this embodiment, the calibration mark sensor 66 is a sensor which not only senses the calibration marks but also has additional functions in the printer and is integral thereto. The sensor 66 can comprise any suitable sensor for these purposes. For example, the sensor 66 may include an optical sensor having a source of optical radiation, such as a light emitting diode for example. In addition, the sensor 66 can include a detector such as a photo-detector for detecting radiation provided by the source and reflected from the media. The sensor 66 can be an analog or digital device and in one illustrative embodiment is an analog device which continuously provides output at the optical detector which corresponds to the amount of radiation being reflected from the medium.

To conduct calibration, the sensor 66 is moved by a motor to a fixed location at which calibration marks will be present on the calibration media. In particular, the sensor 66 can be moved to a location in line with the clearance area 63 such that the calibration marks on the calibration media will move underneath the sensor 66 as the calibration media is fed between the pressure roll arms 60 and the feedrollers 64 and moved in the direction of arrow 68. As each mark passes the sensor 66, the mark absorbs the radiation from the source and therefore the output at the detector is reduced. Accordingly, the location of the marks on the calibration media can be determined by the output of the detector in the sensor 66. Corresponding data from the encoder which detects the position of the feedrollers 64 is also taken by the calibration system and matched with the data taken by the sensor 66 in order to determine the errors between the two and to determine the calibration factors to be utilized by the printer, as will be discussed in greater detail below.

FIG. 3 is a perspective view of an illustrative embodiment of an encoder sensor made and operating according to principles of the present invention. In this example, the encoder includes an encoder disk or code wheel 70 having a home position mark 82 near the center of the wheel as well as a number of incremental marks 76 arranged about the periphery of the wheel near its outer edge 75. For detection of the incremental marks 76, an encoder detector 72 is provided adjacent a first side 71 of the wheel 70. This detector 72 can comprise any suitable receiver device capable of detecting the presence of optical radiation such as a photo-detecting diode or diode optical receiver. In some embodiments, this detector 72 may comprise a quadrature detector, such as two photo diodes spaced from one another, so as to provide two channels of detection signals.

In this embodiment, the source of the optical radiation for detecting the incremental marks is provided adjacent the second side 73 of the encoder wheel 70. Accordingly, the optical radiation is transmitted from the first side 71 of the wheel 70 through the transparent wheel to the second side 73, where it can be detected by the optical receiver/detector 72. However, as the wheel 70 rotates with the printer roller or motor being detected, the incremental marks 76 intermittently block the radiation from being received at the detector 72 thereby causing the detector to produce a substantially pulsed signal, each pulse indicating an incremental movement of the wheel and therefore an incremental movement of the mechanical component being monitored.

The radiation source (not shown) on the second side 73 of the wheel 70 can be any suitable source of optical radiation such as light emitting diode (LED) or the like. The marks 76 are spaced a known distance from one another, and in one embodiment 1,632 marks are provided about the periphery of the wheel at a spacing of 200 marks per inch of circumference and 600 marks per inch of corresponding media movement. In a quadrature design, such a spacing allows for 6528 distinctive digital positions about the wheel (i.e., the two offset detectors produce four possible states between marks), and therefore 2400 (600×4) distinctive indexing locations within each inch of corresponding media movement. If the sensor is also analog in nature, additional resolution can be achieved by using the variable amplitude of the detector signals. In particular, in one embodiment, 256 discrete detector levels can be distinguished for each quadrature encoder count allowing for a total of 6528 times 256, or 1,671,168 possible positions about the wheel, or 2400 times 256 or 614,400 possible positions per inch.

The encoder wheel 70 also includes a home position mark 82 extending further inward from the edge 75 of the wheel than the incremental marks 76. This mark 82 indicates that one revolution of the wheel 70 has been completed and therefore serves as a home position or index position indicator allowing the encoder to sense absolute position of the mechanical component being monitored. In this illustrative embodiment, a detector 80 is provided on the second side 73 of the wheel 70 to sense the home position mark 82. In this example, the detector 80 includes both a source or transmitter 83 as well as a detector or receiver 81. As discussed above, the source 83 may comprise an optical source or an emitter while the detector 81 may comprise an optical sensor or photo-detector. Because both the source 81 and the receiver 83 operate as a reflective sensor, they are provided on the same side 73 of the wheel 70 and in this embodiment are provided on the same printed circuit board 74. In contrast, because the receiver 72 detects transmitted radiation, it is provided on the opposite side of the printed circuit board 74 and is connected thereto by an electrical connector 78 such as one that includes a ribbon connector having wires.

In operation, the wheel 70 is connected with the roller or motor being monitored in the printer, and movement of the wheel 70 indicates corresponding movement of the monitored roller or motor (or other rotational component). As the wheel 70 rotates, radiation from the source is transmitted through the wheel and detected by the receiver 72 which produces a pulsed signal as the marks 76 interrupt the transmission of the radiation to the detectors 72. Likewise, the source 81 produces radiation which reflects off of the side 73 of the wheel 70 and is detected by the receiver 83 until the home position mark 82 is in line with the source 81 at which point the signal from the receiver 83 undergoes a change indicating that the home position or index position has been reached by the monitored motor or roller.

Figure 4:
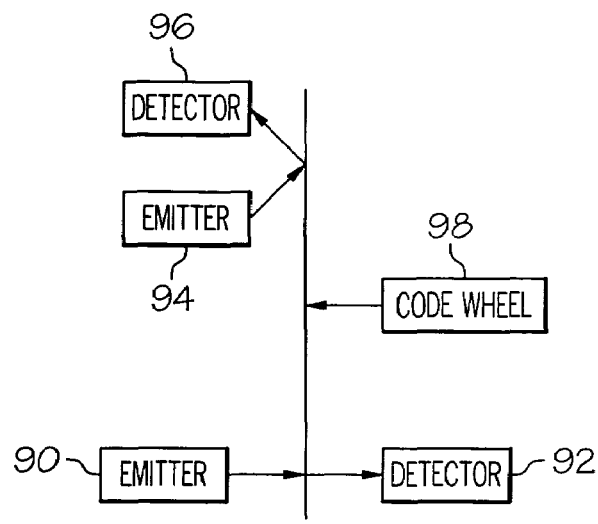
FIG. 4 is schematic diagram illustrating a rotational sensor made and operating according to principles of the present inventions.

FIG. 4 is schematic diagram illustrating an arrangement similar to that of FIG. 3. In this embodiment, the transmissive optical detector comprises an emitter 90 which provides radiation through the wheel 98 which is transparent near its edge except for the incremental marks spaced thereabout.

The detector 92 detects this radiation as it passes through the wheel 98 and produces a signal which undergoes a change when the radiation is blocked by the incremental marks. The reflective optical detector in this embodiment comprises an emitter 94 which provides radiation which reflects off of the opposite side of the wheel 98 and is detected by the detector 96. However, when the home position mark on the wheel 98 is inline with the radiation provided by the emitter 94, the signal from the detector 96 undergoes a change indicating that the home position or index position has been reached.

Figure 5A:
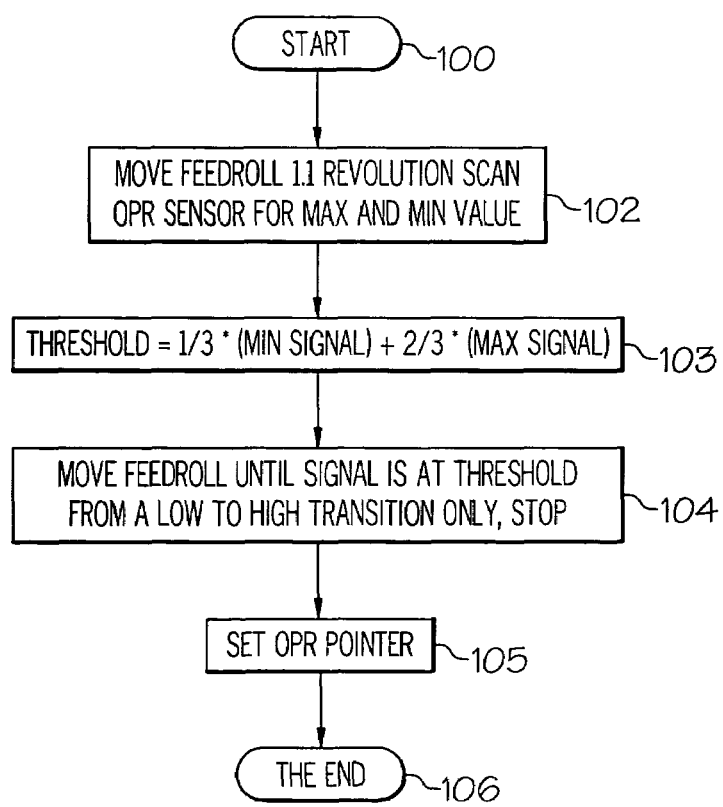
FIG. 5a is a flow chart depicting an illustrative embodiment of a method which can be used to position a roller at the home position, according to principles of the present inventions.

FIG. 5a is a flow chart illustrating an embodiment of an algorithm which can be used to position the feedroller at the home position, such as at power-up of the printer or at any other time that it is desirable to locate the home position of the home encoder and thus the feedroller (or other rotational component monitored by the encoder). At step 100, the algorithm is initiated such as by detection of the initiation event. For example, a controller could detect the application of power to the printer, the detection of an event such as a pause in the printing, or other desired reset event. At step 102, the feedroller is moved 1.1 revolutions. This can be achieved by moving the encoder and counting a number of incremental counts corresponding to 110% of the number of counts on the wheel. In other embodiments, the encoder wheel can be rotated any amount greater than the number of counts on the wheel. During this rotation, the once-per-revolution (OPR) home position sensor, such as the sensor 96 in FIG. 4, obtains data corresponding to the amount of radiation it receives from the corresponding emitter. Simultaneously or subsequently, this acquired data is scanned to determine its maximum and minimum values.

At step 103, a threshold is determined based upon the maximum and minimum values acquired by the OPR sensor. In this embodiment, the threshold is equal to one-third of the minimum signal received plus two-thirds of the maximum received. Thus, the threshold is based upon the minimum signal received by the OPR sensor as well as the maximum signal received, and falls in between these two signals. For example, if the signal from the OPR sensor is in a low state when it receives radiation but in a high state when it does not receive radiation, then the threshold would fall between the low and the high state. As an example, if the output of the sensor was 0 volts when it receives radiation but 6 volts when it does not receive radiation, then the threshold level would be 4 volts according to the example shown in FIG. 5. However, other methods of calculating such a threshold signal could be utilized.

At step 104, the feedroller and therefore the connected encoder disk is moved until the signal from the OPR sensor reaches the threshold level during the transition from a low state to a high state. Because the threshold should define a signal level which should correspond with the beginning of the home position mark on the encoder disk, the feedroller can be stopped when this threshold is met during step 104. Accordingly, the feedroller should then be located at the home position if stopped at this location. A pointer, counter, or other register can then be set or reset once this location is reached. This step is shown in the illustrative embodiment at block 105. The pointer or counter can then subsequently be incremented each time the encoder disk travels a distance equal to the spacing of an incremental mark as detected by the incremental mark sensor. Accordingly, the pointer or counter keeps track of the movement of the encoder disk (and therefore the movement of the attached feedroller or other actuator) from a known home or index position, and therefore the rotational or angular position of the feedroller with respect to home position can be known and utilized if desired for calibration and compensation purposes or for other control purposes. The algorithm is then terminated at step 106 after the pointer has been set.

As a variation to the algorithm of FIG. 5a, block 104 could be eliminated. Instead, during the one complete rotation of block 102, the signal could be continually monitored not only for the purposes of determining the threshold but also for the purposes of determining when the threshold level is reached on a high to low transition. More specifically, the threshold can be calculated using the maximum and minimum data signals during the rotation of block 102. During the same rotation, a counter can keep track of the incremental counts received from the incremental mark detector of the encoder. After or during the one rotation, a separate counter or pointer can then be set to coincide with the incremental count corresponding to the point that the home position sensor data reached the threshold level. Accordingly, an additional rotation is not necessary and the home position point can be set during the rotation or retroactively based upon one complete rotation.

Figure 5B:
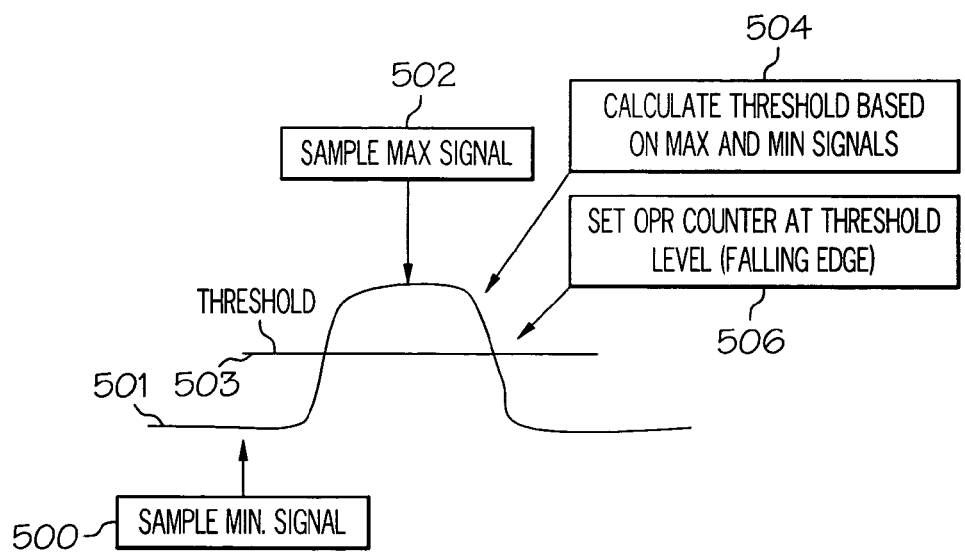
FIG. 5b is a diagram depicting another illustrative embodiment of a method which can be used to position a roller at the home position, according to principles of the present inventions.

FIG. 5b is a diagram depicting another illustrative embodiment of a method which can be used to position a roller at the home position, according to principles of the present inventions. In this embodiment, the threshold is calculated and the home position set without multiple rotations and, more specifically, with minimal amount of needed rotation. In particular, the analog signal from the home position sensor, represented by reference numeral 501 is monitored, as shown at block 500, and the minimum value of the signal received is sampled during this monitoring. As the home position mark is reached, the signal 501 begins a transition from the low state to a high state. The signal is continually monitored during the transition, and the maximum value that the signal reaches is recorded, as shown at block 502. The signal 501 continues to be monitored and when it is detected that it is beginning to transition from the maximum value and back to a low state, a threshold is calculated based upon the minimum value and maximum value, as shown at block 504. For example, the equation discussed above with respect to FIG. 5a could be utilized, as could any other suitable calculation. Then, the once-per-revolution counter can be set once the signal value reaches the threshold level during its transition from the high state (indicating that the home position mark is present at the home position detector) toward the low state (indicating that the home position mark is no longer present at the home position detector). The monitored component can also be stopped at this point so that it is set for movement from this position. For example, this routine could be executed upon powering the printer, and the printer feedroller can be stopped at this point so that it begins subsequent rotation from a known position.

Figure 6:
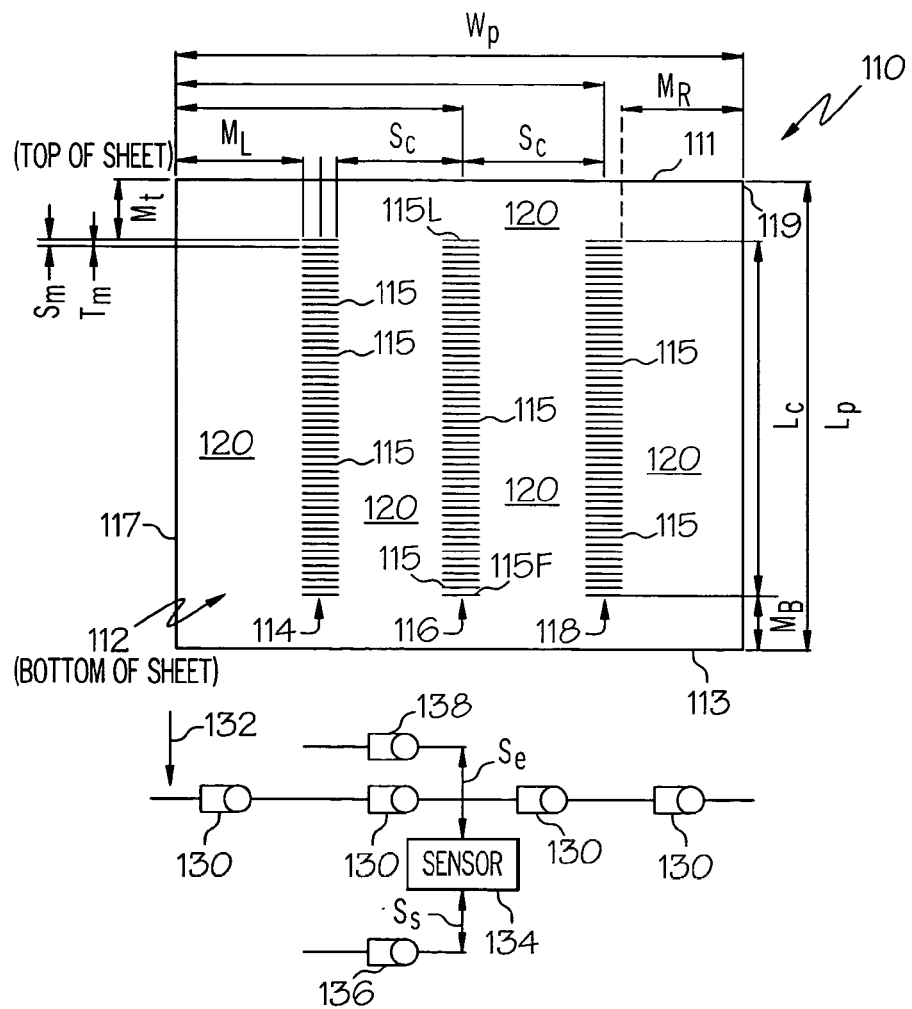
FIG. 6 is a front view of a calibration media which is an example of the type that may be used with the calibration systems described herein, and which is made and used according to principles of the present inventions.

FIG. 6 is a front view of an illustrative calibration media which is an example of the type that may be used with the calibration systems described herein as well as other such systems. In this embodiment, the calibration media 110 includes a plurality of calibration marks 112 located at known locations on the media 110. The calibration marks are placed on printed areas of the media 100 thereby leaving unprinted areas 120. In this example, the marks 112 comprise columns 114, 116, and 118 of marks 115, the columns being spaced by a distance $s_c$. In this example, each mark 115 has a width ($w_m$) and each mark also has a thickness $t_m$, the marks being substantially linear in shape.

The marks 112 are placed on the page spaced from the top 111 of the page so as to provide a margin $m_t$. Likewise, the marks do not extend all the way to the bottom 113 of the page so as to provide a bottom margin $m_b$. Moreover, the first column of marks 114 is spaced from the left edge 117 of the media 110 so as to provide a left margin $m_l$, and the rightmost column 118 is spaced from the right edge 119 of the media 110 so as to provide a right margin $m_r$. Thus, the calibration marks 112 are surrounded by an external margin area.

The placement of the markings 112 and therefore the configuration of the unprinted area can be provided such that portions of the indexing system which contact the media 110 do not contact the calibration marks 112. For example, as shown in FIG. 6, rollers 130 of the indexing system may be spaced such that they contact media 110 at the unprinted areas 120 as the media is fed through the indexing system in the direction 132. Likewise, the bottom margin $m_b$ can be made greater than the vertical spacing $s_s$ between the mark sensor 134 (which senses the presence of the calibration marks 112) and the exit roller 136 (which is the last roller encountered by the media 110 as it moves in the direction 132 and before it exits the printer). Accordingly, the exit roller 136 will be in contact with the bottom edge 113 of the media 110 prior to the first mark 115f reaching the sensor 134. In this manner, the positioning of the media 110 can be better controlled as it moves through the printer and as the calibration marks 112 are sensed by the sensor 134, so as to maintain a smooth media transition through the indexing system of the printer.

Likewise, in some embodiments, the top margin $m_t$ can be made large enough such that it is greater than the distance $s_e$ between the sensor 134 and the first indexing roller 138 to encounter the media 110 (e.g., the pick tire). Accordingly, the edge 111 of the media 110 will still be in contact with the roller 138 when the last mark 115L is sensed by the sensor 134. Again, this configuration can allow for better control of the media and better data obtained by the sensor. For example, "tail flip" can be avoided when the sensor is detecting the presence of the marks 112.

Other configurations are also possible in order to maintain control of the media 110 during scanning by the sensor 134. In addition, although three columns of marks 112 are shown in this illustrative embodiment, fewer or more columns or numbers of marks may be provided. Use of multiple columns allows for obtaining data at multiple locations across the horizontal distance of the media 110, if desired, in order to also account for errors or deviations at other horizontal positions along the feedroller 130. Accordingly, if the feedrate of the feedroller being monitored varies from one side of the printer to the other, obtaining information across the feedroller at various locations by using the columns 114, 116, and 118 can be useful in optimizing the feedrate compensation factor to be utilized. However, only one of the columns may be utilized if desired, such as by utilizing the middle column 116.

The number of marks provided in a given column may vary depending upon the use contemplated. However, in this illustrated embodiment, the number of marks in a given column 114, 116, or 118, as well as the spacing between the marks are configured such that the indexing system rollers and components rotate multiple times before the scanning of the marks 112 by the sensor 134 is completed. For example, there could be between about 5 and about 32 marks per rotation of the feedroller being measured by an encoder, such that between about 5 and about 32 marks move past the sensor during one complete rotation of the feedroller. In particular, there could be 16 evenly spaced marks per such rotation such that the marks are approximately 22.5 degrees of feedroll rotation apart (e.g., 16 marks spaced about 0.17 inches apart for a feedroller having a circumference of 2.72 inches). Accordingly, in this example, 16 marks would move past the sensor during one complete revolution of the feedroller. However, non-integer numbers of marks per rotation (e.g., 16.3 marks/revolution, or about 22 degrees apart) could be utilized to ensure the data points for each revolution are not at the same rotational positions on the feedroller being measured by the encoder. This may aid in determining the phase of the periodic function represented by the data obtained.

In addition, approximately 50 marks are provided per column in this example, so as to provide marks to the sensor during about four complete rotations of the feedroller. However, other configurations, spacings, dimensions, sizes, and placements of marks can be utilized.

Moreover in one embodiment, the media 110 can be a sheet and in one particular embodiment has a thickness of about 0.1 millimeters. In some embodiments, the left margin $m_l$ and the right margin $m_r$ are approximately 47.6 millimeters. The length $l_p$ of the sheet 110 may be between about 100 and about 500 millimeters, and the width $w_p$ can be within that same range. In one particular illustrative embodiment, the width $w_p$ is about 215.9 millimeters, while the length $l_c$ is about 279.4 millimeters. The length $l_c$ of a column of marks 112 on a sheet 110 can be about 211.58 millimeters, and, in one particular embodiment the top margin $m_t$ is about 35.58 millimeters while the bottom margin $m_b$ is about 32.2 millimeters. The width of each mark $w_m$ can be between about 2 and about 200 millimeters (or the page width), and the spacing between each mark can be between about 1 and about 20 millimeters. In one illustrative embodiment, the width $w_m$ of each mark 115 is about 12.7 millimeters, the spacing $s_m$ between marks is about 4.3 millimeters and the density of the marks can be from about 2 to about 10 marks per vertical inch of media. The thickness $t_m$ of each mark 115 can be between about 0.1 and 10.0 millimeters, and in one particular embodiment is about 1.27 millimeters. However, many other configurations and dimensions may be utilized.

Figure 7:
FIG. 7 is side view of another embodiment of a calibration media which is made and used in accordance with principles of the present inventions.

The calibration media 110 may be made of multiple layers, as shown in the example of FIG. 7. For instance, the media 110 may comprise a top layer 140 as well as a bottom layer 142. The bottom layer 142 may be a plastic film or other suitable material having the marks printed thereon, and the top layer 140 may be a protective layer such as an antistatic layer to improve durability and to reduce buildup of static electricity during motion of the media over plastic parts at the printer. In one embodiment, a plastic base material can be made conductive (and, therefore, antistatic) by adding carbon black to the plastic.

Any of a variety of plastic materials or antistatic materials may be utilized for these purposes. Examples of suitable materials include the KODAK PRECISION LINE LPF7 film, available from the Eastman Kodak Company, or the FUJI HSR7 film, available from the Fuji Photo Film Co., Ltd.

The brightness, gloss, and other physical properties of the media 110 can be provided as best suited for the sensor to be utilized. The sensor 134 may be any suitable sensor, such as those disclosed above or the like. The sensor 134 may have a detector and an emitter which are 20 degrees off normal. If the sensor 134 to be utilized is an existing sensor of the printer which senses plain paper, such as an alignment sensor, for example, the background reflection of the unprinted area 120, as well as the brightness property of the media 110, may be similar to that of plain paper.

For instance, the unprinted area 120 may have a 75 degree gloss measurement of between about 4 and 40 as measured by a BYK-Gardner "micro-gloss" 75 gloss meter. These and/or other properties of the media could be established such that the detector signal changes in value by at least 10 percent when detecting a mark versus when detecting an unmarked area. In further exemplary embodiments, these and/or other properties of the media could be established such that the detector signal changes in value by at least 50% or, in some embodiments, by at least 70%, when detecting a mark (versus when detecting an unmarked area). However, the properties and the appearance of the media 110 can be modified and varied as desired for the particular systems and components to be utilized.

Figure 8:
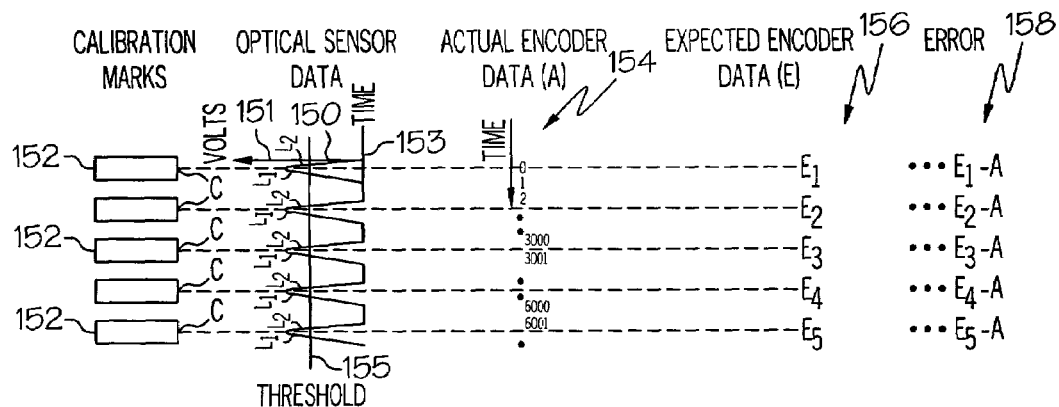
FIG. 8 is a collection of tables and graphs presenting an example of optical sensor data and corresponding encoder data and error data that can be obtained utilizing calibration methods and systems according to principles of the present inventions.

FIG. 8 illustrates several corresponding data tables and graphs that can be derived from the exemplary calibration systems and methods described herein. In particular, illustrative graph 150 represents the output data waveform from an optical sensor that senses the presence of calibration marks 152 on a calibration media as the marks pass the sensor during indexing of the media through a printer. As shown, the waveform 150 may be in analog form, but the corresponding data may be converted or provided in digital form as well for processing by digital processors. This data 150 is provided over time as the marks 152 are moved relative to the sensor during indexing of the media. Accordingly, the axis 151 can represent a voltage level from the optical sensor and the axis 153 can represent time.

During this movement, corresponding encoder data is obtained, as shown by table 154. This data is obtained and matched in time to the corresponding sensor data 150. This can be achieved by maintaining a clock count during the acquisition of data from the optical sensor and during acquisition of the encoder data. The clock count can then be used to match the two sets of data from the two sensors. As an alternative, the data from both sources can be simultaneously placed in one or more tables or arrays as it is obtained, the tables or arrays providing the time correspondence between the data 150 and the data 154. The number and spacing of calibration marks provided on the calibration media will determine the amount of data taken from the optical sensor and the encoder. In one illustrative embodiment, the calibration marks are provided on the media so that marks continuously pass the optical sensor during multiple rotations of the printer indexing feedroller. For instance, the marks could be placed to correspond to from about 2 to about 10 rotations of the feedroller, and in one illustrative embodiment the marks are placed to correspond to about 4 rotations of the feedroller.

Once the data is obtained, it can be determined which of the encoder data entries 154 corresponds to the time when the approximate center C of a calibration mark 152 was passing the optical sensor. This can be achieved in some embodiments by defining a threshold level 155 at which the optical sensor output 150 is likely to be near the center of the mark. Various formulas and methods may be utilized to define such a threshold, such as by taking a percentage of the maximum signals received, and some possible embodiments will be described in better detail below.

Once the threshold is defined, then the locations L1 and L2 where the output 150 equals the threshold can be determined by comparing the data 150 to the threshold 155. These locations can then be used to determine the approximate times when the center C of each marks 152 was sensed. For example, the value near the middle of locations L1 and L2 could be utilized, or the average of locations L1 and L2 for each mark could be utilized. The encoder data 154 corresponding to those center times can then be obtained and utilized as the encoder readings corresponding to the approximate mark centers C.

These encoder data readings can then be compared to expected encoder readings E at the location of the marks 152. The expected encoder readings E can be obtained because the locations of the marks 152 on the calibration media are known (e.g., the marks are placed at particular known locations and spacings along the calibration media). Then, the error data 158 can be calculated by comparing the expected encoder readings at the mark centers to the actual encoder readings at those locations. For example, the actual readings A can be subtracted from the expected readings E at the center times to determine the error data points. As an alternative, error data 158 can be calculated for the entire set of actual encoder data 154 and the error data points for the centers of the marks 152 can be obtained, such as by using the center determination methods described herein.

Figure 9:
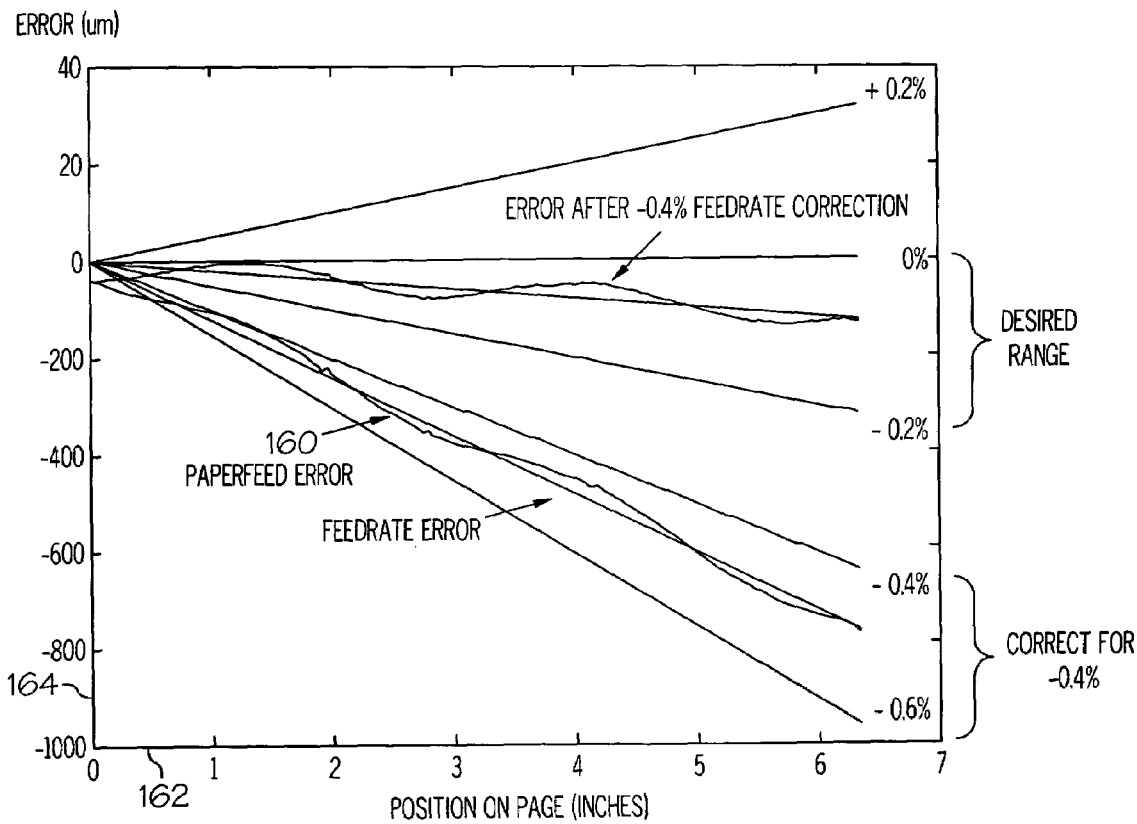
FIG. 9 is a graph illustrating error data that can be measured and compensated according to principles of the present inventions.

Once the error data is obtained by these or other suitable methods, it can be utilized to calibrate the printer in order to compensate for the errors during printing. FIG. 9 includes a graph illustrating a waveform 160 representing an illustrative error data set obtained during such calibration measurements. As seen in this example, the waveform can include both a persistent or cumulative substantially linear component as well as an alternating or periodic component, such as AC and DC components similar to those described in U.S. Pat. No. 6,428,224, the entire disclosure of which is hereby incorporated herein by reference. In particular, in this example, the error increases (in the negative direction on error axis 164) as the position of the calibration media on the page increases on position axis 162. However, rather than increasing completely linearly, the error includes an alternating component. The linear cumulative component can be attributed to errors such as a deviation from the desired average diameter of the feedroller and/or other indexing system components, while the periodic component could be attributed to eccentricity type errors such as deviations from the desired circular shape of the feedroller or other system component. For instance, the periodically varying component of the error 160 could resemble a sine function having varying amounts of error based upon the angular position of the feedroller, and such periodic errors can be caused by oblong rotating indexing components (i.e. components which deviate from a desired circular shape) or from axes of rotation that are off center.

In this example, the error increases in the negative direction as the paper position increases. Thus, for example, the error is approximately –100 micrometers at the position of 1 inch and the error is about –450 micrometers at the position of 4 inches, and the error is about –750 micrometers at the position of 6 inches. A negative error means that the actual encoder readings at the various calibration marks is greater than the expected encoder readings at those marks, meaning that the media has been underfed from what would have been expected (i.e., the media has not advanced as much as it should have for that amount of feedroller rotation). However, other error graphs are possible, such as those having positive error amount in overfeed situations where the media is fed further than would be expected for that amount of feedroller rotation. Also, the error waveform may have substantially little periodic component or substantially little cumulative component, depending on the printer and the precision of the indexing components.

Figure 10A:
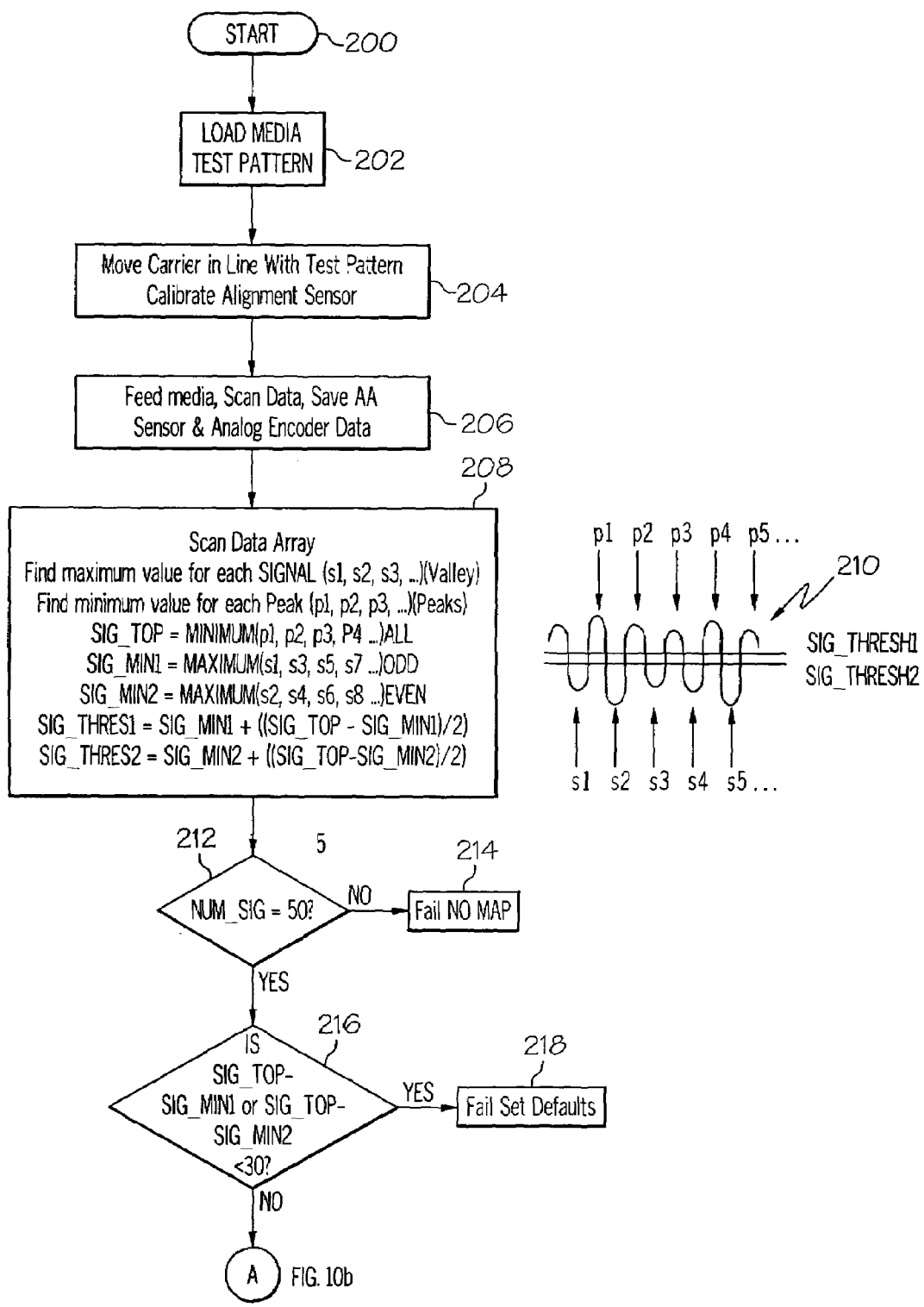
FIG. 10, beginning at FIG. 10a and continuing through FIG. 10e, is a flow diagram depicting an illustrative calibration method that can be utilized to determine media indexing compensation factors and that operates according to principles of the present invention.
Figure 10B:
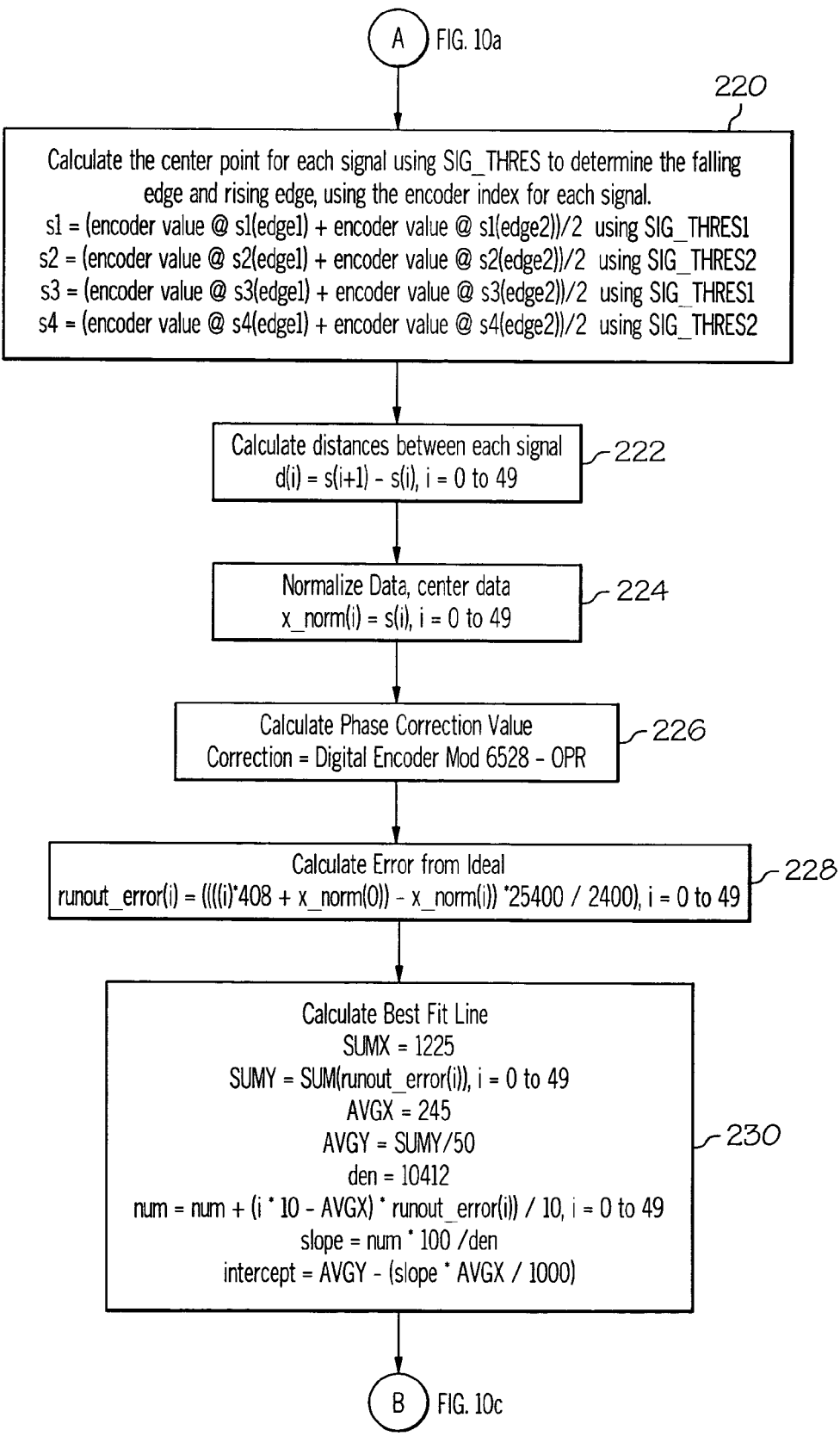
Figure 10C:
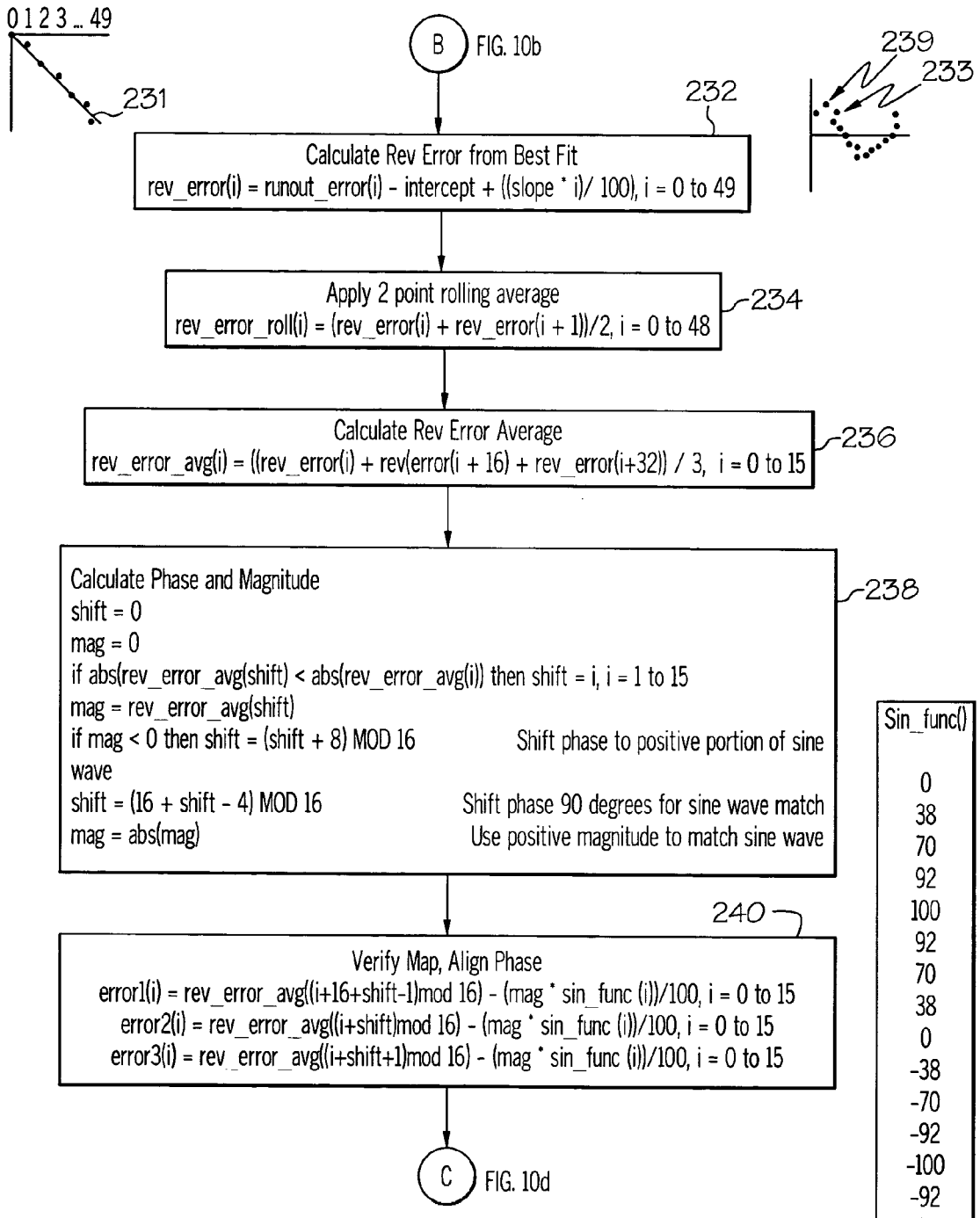
Figure 10D:
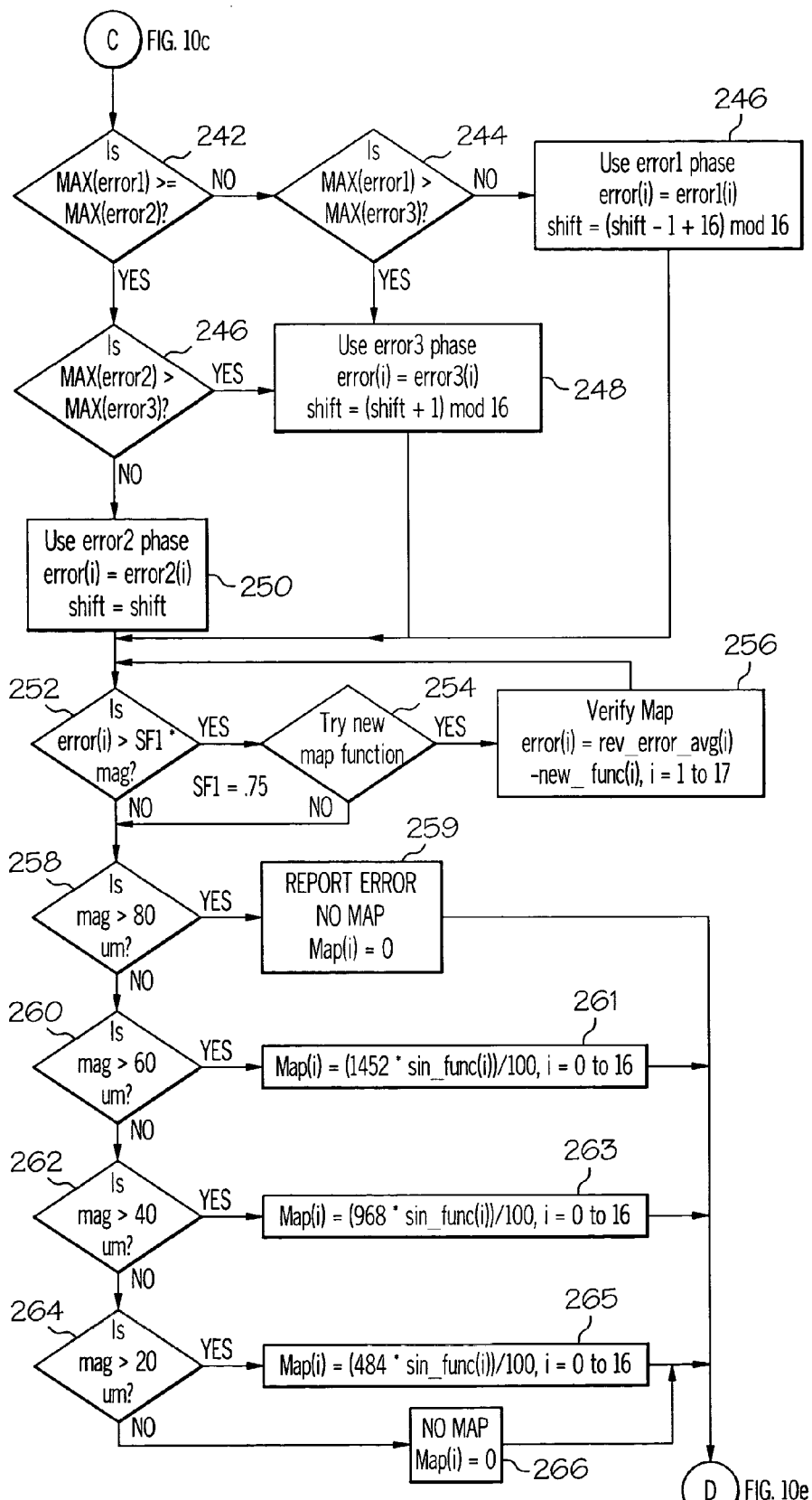
Figure 10E:
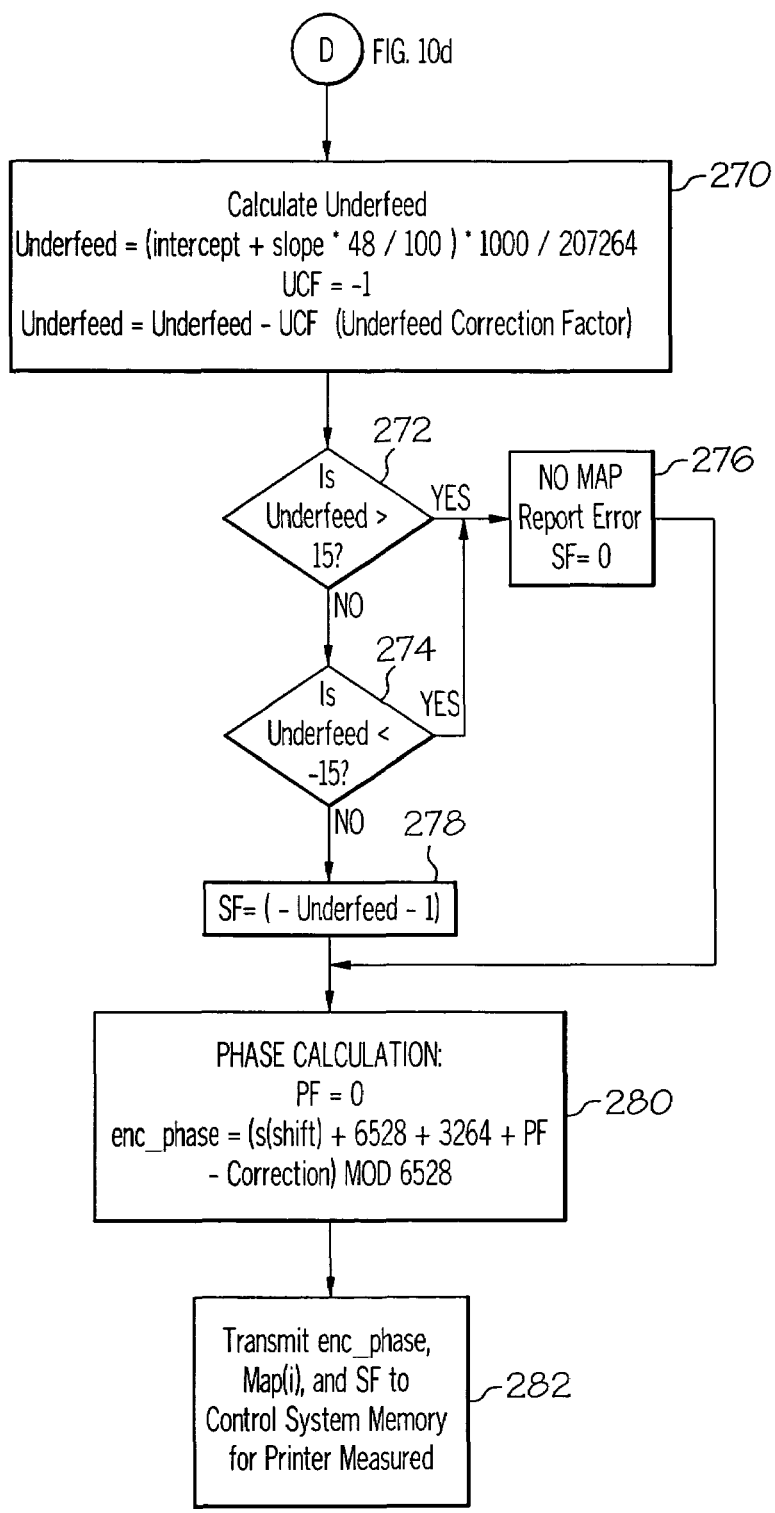

FIG. 10, beginning at FIG. 10a and continuing through FIG. 10e, is a flow diagram presenting an illustrative embodiment of a method or algorithm that can be utilized to determine compensation factors that may be utilized by a printer indexing system. The algorithm illustrated may be embodied as a program, code, or instructions executed by a computer, controller, or other processing circuit.

In this embodiment, the method is initiated at step 200 when it is desired to determine or re-determine compensation factors to be used for a given printer. The method can be initiated in any suitable manner, such as by initiating a calibration software program running on a computer at a factory where printers are manufactured. Alternatively, the program can be run at other locations, such as at other facilities of the printer manufacturer or at the location of the user. Moreover, the method could be executed by suitable circuitry within the printer itself.

At block 202, the calibration media having a test pattern is loaded into the printer, such as in a manner similar to the loading of a print medium (e.g., by causing the printer to conduct a standard paper pick operation). The test pattern can comprise calibration marks or patterns placed at known locations, such as those shown in the examples discussed above. During this step, the calibration media can be advanced a predetermined distance, such as by moving the media a known number of print lines by moving the feedroller a predetermined number of incremental marks (e.g., 300 marks on a 600 mark per indexing inch encoder) for instance.

Next, at step 204, the carrier having the sensor for detection of the marks is moved in line with the marks. This can be achieved by moving the carrier a predetermined horizontal distance which corresponds to the distance that the marks are placed on the calibration media. As discussed above, this sensor may comprise an existing sensor in the printer utilized for other purposes, such as for alignment of the printheads or media type detection for instance. The sensor can also be calibrated during this step such as by taking a reading at an unprinted area of the page and comparing this to other such data, or by other suitable processes.

Once the calibration marks are aligned with the calibration mark sensor, scanning of the calibration marks can commence. In particular, in this embodiment, at step 206, the calibration media is fed through the printer utilizing the existing printer indexing system while the sensor continually scans the media as it passes by the sensor. In some illustrative embodiments, the media can be fed at a rate of about 2 inches per second for example, while the sensor scans (obtains data from) the media at a rate of about 12.5 kHz for example. Other rates are also possible. If an optical sensor is utilized, the signals provided by the optical sensor during this scanning represent the amount of optical radiation reflected from the media and received by the sensor's receiver (detector) during the scanning. These signals can be saved as digital data, such as in a memory. During this movement of the media and scanning by the sensor, corresponding data signals can be obtained from a sensor or sensors monitoring mechanical components of the media indexing system moving the media. For instance, as discussed above, a rotary encoder whose home position is known can provide data representing the position of the feedroller or the feedroller motor as it advances the calibration media through the printer. This data can comprise analog data or a digital count indicating the position of the component.

Once obtained, the data from the sensors can be analyzed to determine which parts of the data represent the approximate centers of the calibration marks. For example, at step 208, the data from the calibration mark sensor can be scanned to determine the thresholds which can be utilized to assist in locating the data points representing calibration mark centers. Although numerous methods could be utilized for locating the center data points, one illustrative method is provided in FIG. 10a. In this example, the data 210 is scanned to determine a plurality of peak points (p1, p2 . . . pn) and a plurality of valley points (s1, s2 . . . sn). Then, the minimum value of all of the peak signals (p1, p2 . . . pn) can be determined and assigned to a variable (e.g., SIG_TOP) which thereby represents the lowest value of all of the peak signals. In a similar manner, the maximum value of the valley signals (s1, s2 . . . sn) can be determined. In this example, for greater accuracy, a maximum value (SIG_MIN1) for odd valley signals (s1, s3, s5 . . . ) is determined, and a separate maximum value (SIG_MIN2) is determined for even valley signals (s2, s4, s6 . . . ). The determination of the valley signals, the peak signals, and their corresponding maximum and minimum signals can be carried out in any suitable manner, such as via comparison techniques or other appropriate automated analog or digital signal processing techniques.

Once the various calculations are made, one or more thresholds can be defined. In this example, a first threshold (SIG_THRES1) is defined by adding SIG_MIN1 to one half of the difference between SIG_TOP and SIG_MIN1. Likewise, a second threshold (SIG_THRES2) is defined by adding SIG_MIN2 to one half of the difference between SIG_TOP and SIG_MIN2. However, other methods for determining such thresholds can be utilized.

At step 212, it is determined whether the calibration mark sensor has detected the correct number of marks. This can be determined by counting the number of valley or peak signals obtained and compare to a predetermined number corresponding to the number of calibration marks (e.g., 50) on the page. If the number obtained does not correspond to the predetermined number, then the algorithm can be ended and a failure or error condition indicated, such as is shown at step 214. If the number obtained is correct, then the method can proceed to the next step (e.g., step 216 of FIG. 10a).

Additional or alternative error detection steps can also be utilized for detection of an error in the calibration process and to thereby ensure that the compensation factors which are calculated are based upon reliable data. For example, at step 216 it is determined whether the difference between SIG_TOP and SIG_MIN1 or SIG_MIN2 is less than a predetermined value (e.g., 30). This would indicate that the peak signals and valley signals were too close together and therefore the sensor data was not reliable or accurate enough to calculate thresholds. If this is the case, then the process can be terminated and an error or failure condition indicated at step 218. Default settings can then be utilized.

If the data appears to be sufficient, then the process may continue to step 220. During this step, corresponding encoder values for the center positions of the calibration marks can be determined. In this example, the valley points within the calibration mark sensor data should correspond to instances when the approximate center of the calibration mark was passing the sensor (and thus the lowest amount of radiation was being received by the sensor). Accordingly, the edge of each calibration mark should pass the center at the approximate time that the data falls below a threshold level. In this illustrative embodiment, SIG_THRESH1 is utilized for each odd number valley point, while SIG_THRESH2 is utilized for each even numbered valley point. The data can be compared to the appropriate threshold utilized to determine when the data falls below the threshold. For each valley point, there should be two corresponding locations where this occurs: once while the data signal is decreasing (corresponding to the sensor reaching a beginning edge of a calibration mark) and once while the data signal is increasing (corresponding to the sensor reaching an ending edge of a calibration mark).

The corresponding encoder readings at each of these two edge locations are then obtained. Then, the average of the two encoder readings at the edges can be utilized as the corresponding encoder reading for the approximate center of the mark, and these averages are then saved in variables (e.g., s1, s2 . . . sn). As will be discussed in greater detail below, because the locations and spacings of the marks on the calibration media are known, as is the amount of indexing per encoder pulse, the expected encoder reading for that mark can also be calculated, and the difference between the calculated actual reading and the calculated expected reading can be utilized for error determination.

Once encoder data for the corresponding calibration mark centerpoints are calculated or determined, the distances between these points can then be determined. For example, as shown in step 222, the distance d(i) between subsequent encoder center points can be determined by subtracting each encoder center point from the next calculated encoder center point.

The encoder centerpoint data can also be normalized so as to start at zero since the calibration marks on the media are referenced to zero. Step 224 shows an illustrative process that can be utilized to achieve this. Additional corrections and normalizations can also be utilized if needed. For example, in this embodiment at block 226, a phase correction value can be calculated by utilizing the modulus of 6528 (the total number of encoder counts that would be expected if a 1632 mark quadrature encoder were rotated one time during scanning of calibration marks) and the number present in a once-per-revolution counter (a counter reset at power-up when the encoder is moved to its home position). As will be described in further detail below, this value can be utilized to correlate a once-per-revolution counter that keeps track of the encoder home position with a position counter for the page being indexed.

Next, the error for each encoder centerpoint can be calculated. In one embodiment, the ideal or expected encoder data value at each centerpoint can be subtracted from the actual centerpoint data. For example, if each mark were 408 encoder counts apart, each error point would be equal to the normalized encoder datapoint (x_norm(i)) minus the calibration mark number (i) times 408. However, in the example of step 228 of FIG. 10, a slightly different equation is used. Here, each normalized encoder centerpoint data (x_norm(i)) is subtracted from the sum of the corresponding mark or array number (i) multiplied by 408 (the number of encoder counts in a 2400 quadrature count per inch system that corresponds to a calibration mark spacing of 0.17 inches) and the first normalized centerpoint data (x_norm(0)). This difference is then multiplied by 25400/2400 to convert the units into microns. Accordingly, error data can be determined that represents the difference between the expected encoder count (or expected distance from a previous mark) at each calibration mark and the actual measured count or distance at that point (or a similar count calculated from actual counts). This data can be saved in an array or variable or matrix (e.g., runout_error(i)).

Once the error at each centerpoint is determined, it can be utilized to determine compensation factors. For example, a function can be fit through the error data, and in particular the parameters of a such a function that best fits or substantially fits the data can be obtained. In the example of FIG. 10, parameters for both a linear function and a periodic function are obtained, since the data can often have both linear cumulative aspects as well as recurring periodic aspects. The first step of obtaining the linear parameters is depicted at step 230. Here, the slope and the intercept are the two parameters of the line 231 that are calculated. This can be conducted in any appropriate manner based upon the number of data points and the other specifics of the data obtained. In this example, since 50 data points were taken, the sum (SUMX) of the x-axis numbers (0 to 49, for each datapoint) is 1225 and the average of these numbers is 1225/50 or 24.5, which is multiplied by 10 to obtain AVGX. The corresponding sum SUMY on the y-axis values would then be the sum of the various encoder data error at each point (runout_error (i)) and the average (AVGY) of these numbers would be that sum divided by the number of datapoints (50 in this example). Based upon these values, the slope and the intercept of the line fitting the data can be calculated, such as by using the illustrative equations shown at step 230 or by any other appropriate method.

Once the parameters of the line that best fits the data are known, then the parameters of the periodic aspect of the data can be obtained. For example, the best fit line can be subtracted from the data and the remaining data 233 would represent the periodically recurring aspect of the data. In step 232 in the example of FIG. 10, this periodic component is saved in an array (rev_error(i)) by taking each error datapoint (runout_error(i)), subtracting the intercept and adding the value of the slope multiplied by the point number divided by 100. However, other suitable calculations and algorithms can be utilized to separate the linear component from the periodic component of the data.

To assist in smoothing the resulting periodic component, averaging or other techniques can be utilized. In the example of FIG. 10, a two point rolling average of the data is calculated, as shown at step 234. In addition, the average of the periodic data for various corresponding periodic points can also be taken, such by using the illustrative calculation shown in step 236. In this example, sixteen error points are taken for each revolution of the encoder (and corresponding revolution of the feedroller) and the encoder is rotated three times. Accordingly, the second error data point taken would have a corresponding data point at the eighteenth data point and the thirty-sixth data point. The values at these three points can be averaged to obtain a single average error data point, as shown at step 236, and this averaging can be conducted for each datapoint obtained in a given revolution. Thus, a single average error can be obtained for each calibration mark provided within a single rotation of the feedroller (and therefore for each corresponding location along the circumference of the feedroller). As can be understood, other numbers of datapoints and revolutions can be utilized for a given application.

Once any desired averaging and/or filtering of the data is complete, the phase and the magnitude of this periodic data can be calculated. Step 238 illustrates an example of how this can be achieved. The data is first scanned to determine what point has the highest magnitude. In the example plot 233, this point might by point 239. The equations shown in step 238 could be utilized to determine this point, such as by comparing each point to the previous point with the highest value, and making a variable (e.g., "shift") equal to the current location in the array if it has a higher absolute value. Once this data point is identified, the magnitude parameter of the periodic function can be set equal to the absolute value of the error at that data point.

The phase parameter of the periodic function (i.e., which data point, counting along the x-axis) having that highest absolute value can also be determined. In the example of FIG. 10, this can be determined using the calculations shown. As shown in this example, if the magnitude at the point having the highest value is a negative value, then the phase can be shifted by one hundred and eighty degrees and a positive amplitude utilized. Moreover, the phase can be shifted to match the phase of an ideal sine wave, as it can be assumed that the data matches that of a sine wave. However, it is possible that the data may more closely match other periodic functions, in which case other appropriate calculations may be utilized.

The magnitude and phase determined can then be utilized to populate a compensation table or map for use during compensation or correction of media indexing components. However, it may be desirable to first verify that the magnitude and/or phase are substantially reliable. In this embodiment, this is conducted at step 240. During this step, the calculated phase is shifted forward and backward by one datapoint and the results compared to an ideal sine function to determine whether the calculated phase most closely aligns or matches an ideal sine function or whether the shifted phases provide a better match. In particular, in this example, the difference between the average error data (rev_error_avg) and the magnitude of the ideal sine function is determined for the calculated phase (shift) as well as for a slightly adjusted phase (shift−1 and shift+1). These differences are stored in arrays (error1, error2, and error3). Accordingly, it can then be determine which of the three best matched the ideal function.

More specifically, at decision block 242 it is decided whether the maximum value of the error1 array is greater than that of the error2 array. If not, and if the maximum value of the error1 array is also not grater than that of the error3 array (As determined by decision block 244), then the error1 data displayed the lowest amount of error and the phase corresponding with the error1 calculation (i.e., "shift−1") should be utilized as the calculated phase, as shown at block 246. However, if the error3 indicates the lowest error (as determined at blocks 242 and 244), then the phase corresponding to the error3 phase should be utilized as the calculated phase (i.e., "shift+1" should be utilized), as shown at block 248. Finally, if the error2 data exhibits the smallest error (as determined by blocks 242 and 246) then the phase corresponding with the error2 data should be utilized (i.e., "shift" should be utilized), as shown at block 250. (The modulus or remainder function is utilized relative to the value 16 in the equations so that each point under consideration falls within the sixteen data points in the array). Thus, the calculated phase can be verified via the steps 240–250. However, it should be understood that other methods for verifying the sufficiency of the calculated phase can be utilized other than the particular methods and calculations shown in this example.

In addition to verification of the calculations, the method can also include steps for verification of the sufficiency of the periodic function to be utilized. In particular, in this embodiment, the error data (error(i)) (representing the difference between the average error datapoints and the sine function at the calculated phase) is compared to a predetermined value, at step 252. If the error exceeds that level, then a new function is chosen, as shown at step 254. This alternative function could comprise any suitable periodic or other polynomial function, such as a cycloid function for example, or a polynomial function to which the data best fits. The alternative function is selected at step 256.

Once selected, the new function can be subtracted from the average error data to determine how closely the new function fits the data. The results of the subtraction can be stored in an array (e.g., error(i)). This array can then be again compared to the predetermined value, at step 252 to determine if it exceeds an acceptable level. If so, then steps 254, 256 and 252 can be repeated until a function is chosen that more suitably matches the data. It should again be noted that function verification techniques different from the examples given herein can be utilized as desired.

As noted above, the magnitude of the average error data was calculated at step 238. However, rather than utilizing this magnitude for populating an error map for the once-per-revolution errors from this calculated magnitude, predetermined magnitudes can be utilized based upon the range within which the calculated magnitude falls. In this example, the magnitude is compared to various threshold levels to determine in which range it falls, Based upon the range, a mapping function is defined. In particular, at step 258, the magnitude of the average error data is compared to the highest threshold value (e.g., 80 micrometers) and if it exceeds that level, then step 259 is executed to report an error condition. In other words, the magnitude is larger than what should be expected, and a failure condition is indicated.

However, if the magnitude falls below that threshold but above one of the thresholds defined in steps 260, 262, and 264, then a specific mapping function array is defined by steps 261, 263, and 265 depending on which of the thresholds is exceeded. In this example, if the magnitude is less than 80 micrometers but greater than 60 micrometers, then the mapping function is defined as a sine function having an amplitude of 1452, as shown at step 261. (Here, the amplitude of 1452 is in analog resolution and corresponds to a 60 micron error (i.e., 1452 is calculated by taking 60 microns times 2400 digital counts per 25400 microns times 256 analog counts per digital count)). In addition, if the magnitude is less than 60 micrometers but greater than 40 micrometers, then the mapping function is defined as a sine function having an amplitude of 968, as shown at step 263; and if the magnitude is less than 40 micrometers but greater than 20 micrometers, then the mapping function is defined as a sine function having an amplitude of 484, as shown at step 265.

Finally, if the magnitude falls below a minimum threshold (e.g., 20 micrometers), then another error or failure condition can be indicated, or the once-per-revolution compensation factors could be set to zero, effectively disabling this compensation component as shown at step 266. Thus, the magnitude of the chosen mapping function need not be exactly the calculated magnitude (although it could be), but rather could be a selected predetermined magnitude which would bring the error within an acceptable level, depending on the size of the calculated magnitude. In addition, error conditions can be indicated if the calculated magnitude is at a level which would indicate that the data is not reliable.

As was discussed above, in addition to the periodic component of the data, a linear or cumulative component of the data was also present and this component can be utilized to determine an feedrate compensation factor. In this example, the linear component was extracted from the data by determining the parameters of a line which best fit that data. At step 270 of this embodiment, the calculated line parameters can then be utilized to determine an feedrate error value. In particular, the feedrate error can be calculated using the slope and the intercept parameters of the best fit line, which were calculated at step 230. Specifically, the illustrative equation of step 270 uses the last point of the best fit line and divides that point by the overall advancement of the media at that point. For example, if the media was advanced 3 revolutions at 2.72 inches per revolution, and if the error at the last point of the calculated line were 0.155 inches, then the feedrate error would be 0.155/(3*2.72) or 0.19 percent. This feedrate error value can then be added to a correction factor if needed to make any necessary adjustment or scaling of the amount. Other corrections can also be utilized if needed, such as to adjust for the physical characteristics of the calibration media utilized as compared to the typical media to be used in the printer.

Like the periodic function parameters, the feedrate error value can then be compared to various thresholds to ensure that it is accurate. In this example, the feedrate error value is compared to high and low thresholds at steps 272 and 274. If the value falls outside of the acceptable range, an error or failure condition is reported at block 276, in order to indicate that the data is likely not a valid representation of the actual error in the system and that the process was not performed properly. If the value is within an acceptable range, then a feedrate compensation factor can be defined based upon the feedrate error value. In this example, the feedrate compensation factor is a scaling factor as shown at step 278, such that if the feedrate error amount were 0.19 percent, the scaling factor magnitude would be 1.0019.

As another alternative, the feedrate error value could be compared to various ranges, and a predetermined scaling factor could be selected depending upon the range in which the feedrate error value fell. For example, similar to the selection of the periodic function magnitude discussed above, if the feedrate error were between 0.6 and 0.4 percent, a factor of 0.4 percent could be utilized; if the feedrate error were between 0.4 and 0.2 percent, a factor of 0.2 percent could be utilized; if the feedrate error were between 0.2 and −0.2 percent, a factor of 0 percent could be utilized; if the feedrate error were between −0.4 and −0.2 percent, a factor of −0.2 percent could be utilized; if the feedrate error were between −0.6 and −0.4 percent, a factor of −0.4 percent could be utilized; and if the feedrate error were outside of these ranges, an error could be indicated.

Figure 17:
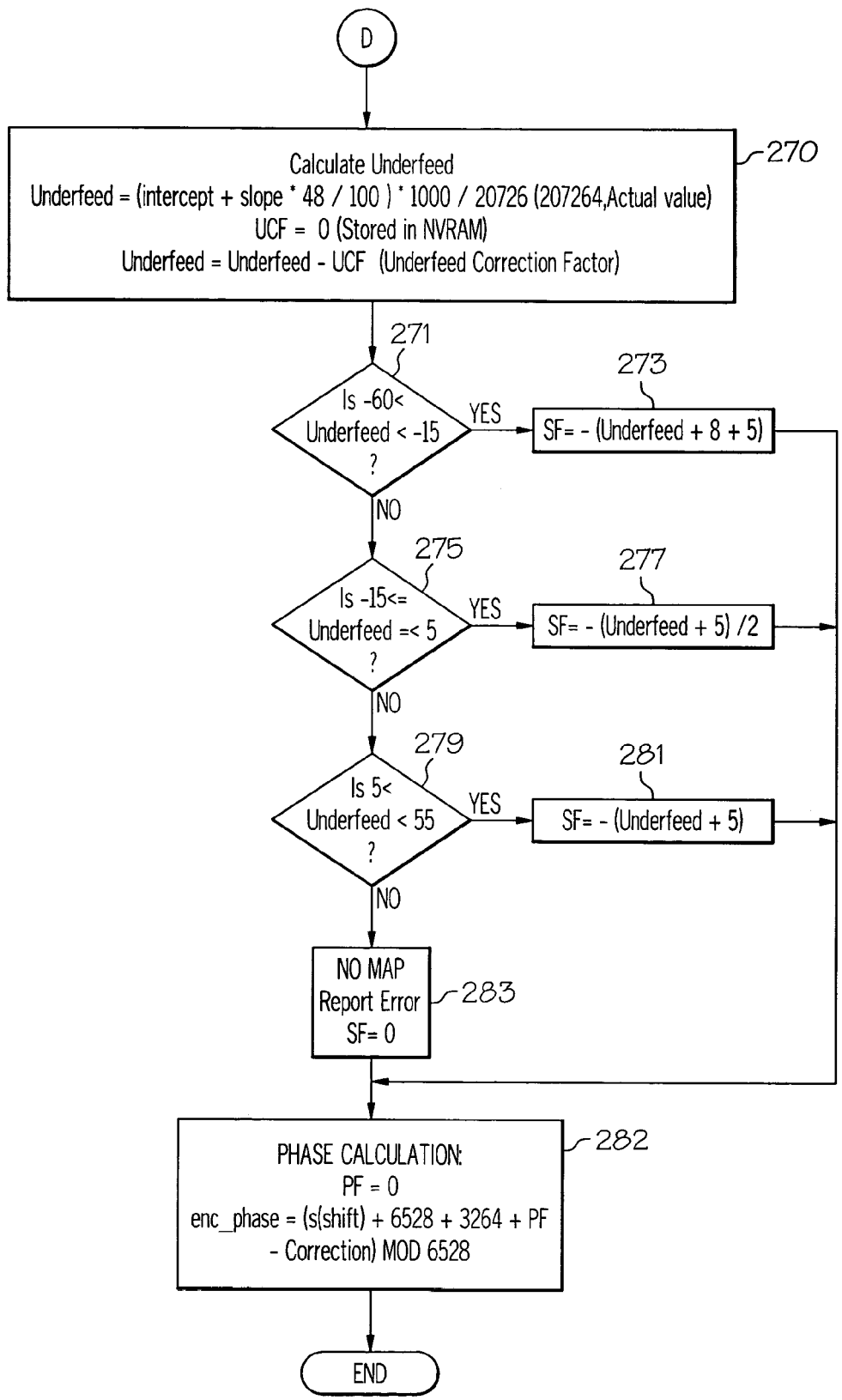
FIG. 17 is a flow chart illustrating an alternative to some of the operations of FIG. 10 for determining a scaling factor, and in which the result favors an underfeeding rather than an overfeeding, according to principles of the present invention.

A similar alternative is shown in FIG. 17, which shows steps 271, 23, 275, 277, 279, 281, and 283, which could be used to replace steps 272, 274, 276, and 278 of FIG. 10. In this alternative, it is determined within which range the feedrate error falls and the amount of compensation is adjusted based upon the range, such that the result favors an underfeeding result rather than an overfeeding result. In particular, if the feedrate error is between −0.60 and −0.15 percent of underfeed, then the feedrate scaling factor can be set to the opposite of the amount of the error plus an insurance amount to help ensure that the result is not an overfeeding of the media, as shown at blocks 271 and 273. Here, the insurance amount is 0.08 percent (5+3). Likewise, if the feedrate error is between −0.15 (underfeed) and +0.05 percent (overfeed), the scaling factor can be set to the opposite of the amount of the average of the error plus an insurance amount (e.g., 0.05 percent) divided by 2, again to help ensure that the result is not an overfeed, as shown at blocks 275 and 277. Finally, if the feedrate error is between +0.05 and +0.55 (indicating an overfeed situation), then the scaling factor is set to the opposite of the amount of the error plus an insurance amount(0.05), again to ensure that a slight underfeeding results from the compensation, as shown at blocks 279 and 281.

The end result of these blocks is to skew the compensation toward a compensation that results in a small underfeeding (e.g., of around 0.05 percent), rather than toward exactly zero error. The reason that this is desired is that a perfect compensation can almost never be achieved, and it is therefore more desirable to ensure a small underfeeding than an overfeeding, because underfeeding is much less noticeable than overfeeding. More specifically, overfeeding results in white gaps in the printed image which are more noticeable than overlapped swaths within the image. The last block of FIG. 17, shown at block 283, reports an error condition if the feedrate error is outside of an acceptable range (e.g., greater than 0.60 percent underfeed or 0.55 percent overfeed).

Accordingly, in the above examples, a feedrate compensation factor is provided from the cumulative error component, and periodic compensation factors (an error map array and a phase parameter) are also provided from the periodic error component of the data. These calculated compensation factors, or other factors or parameters derived from or based upon these factors, can then be utilized for media indexing compensation in the printer being measured by the calibration process. Adjustments to the factors or parameters may be necessary in order to obtain values for use in the particular printer system utilized. For example, the calculated phase for the periodic function can be converted to a corresponding number of encoder counts, if needed for the particular application. In this example, a calculation is provided at step 280 of FIG. 10 to convert the calculated phase shift to a number of encoder counts for the encoder being utilized, so that the periodic error map data can be referenced to the home position of the encoder to align the error map with the physical position of the feedroll. Such an alignment is desired so that the correct periodic (once-per-revolution) error compensation factor is applied to the corresponding rotational position of the encoder during use.

The method of FIG. 10 can be utilized for each individual printer being manufactured, to obtain unique periodic error compensation factors and feedrate compensation factors for each individual printer being manufactured. In addition, or alternatively, the method may be utilized by the user of the printer.

Accordingly, the calculated factors utilizing the calibration method can then be provided to the media indexing control system memory for the printer which was measured using the method, as shown at step 282. In this example, the compensation factors which are transmitted to the control system include: 1) the mapping function array (Map(i)) determined at steps 261, 263, or 265 depending on the magnitude and the best fitting periodic function for the periodic component of the error data; 2) the encoder phase adjustment (enc_phase) calculated at step 280 and based upon the determined phase of the periodic component of the error data; and 3) the feedrate compensation scaling factor (SF) calculated at step 278 and based upon the linear component of the error data.

Figures 11A, 11B:
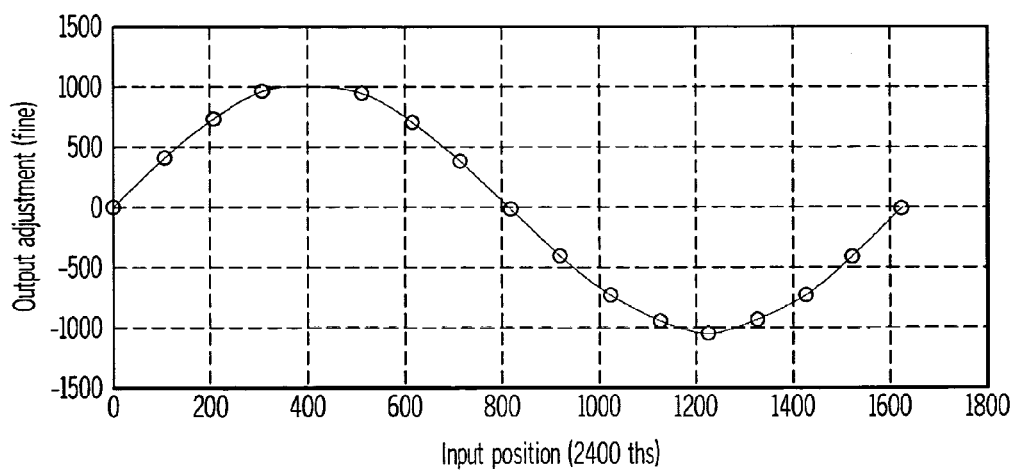

These compensation factors can be stored in memory in the control system for the printer. For instance, in the example of FIG. 11*a*, a compensation map or table 300 is stored in memory, such as via a lookup table, a matrix or other suitable storage mechanism. The table can include values 302 corresponding to various rotational positions or locations along the encoder, as well as a corresponding periodic error compensation factors 304 for each of the various positions, and these illustrative data points are represented graphically in FIG. 11*b*. The table 300 can be created utilizing the mapping function array (e.g., Map(i)) or can comprise the array itself. Accordingly, the table 300 maps locations 302 along the rotational sensor or rotational component to corresponding position control compensation factors 304 to be added or subtracted in determining the final position command of the component as it moves the print media to a position at which the print substance will be applied.

For example, in this embodiment, if it were determined that the rotational component (e.g., feedroller) were to end up at a position corresponding to a relative encoder count of 612 (corresponding to the 612$^{th}$ mark on the encoder), then a position count of 724 (in fine analog units of 2400×256 units per inch) can be added to the position command to compensate for the periodic errors measured during the calibration process. The calculated phase amount should be utilized as well so that there is proper alignment between the map and the correct position on the rotational sensor. For example, the map can be adjusted as needed by the phase amount calculated, or the selection from the map varied based upon the phase amount. For instance, if a corresponding 90 degree phase shift was measured during the calibration process, the data could be shifted forward in the map by four data points. Other methods for making such adjustments could also be utilized.

In addition to the periodic component compensation factors, the memory of the control system could also store the feedrate compensation factor. In particular, this factor is shown stored in memory location 306 in FIG. 11a. Because this factor can correspond to a scaling factor or percentage adjustment parameter, it may be utilized to adjust the position command by a proportional amount. For example, if the next printing location for the image being printed would require movement of the feedroller by 1000 encoder counts to advance the print media vertically to the correct location, and it was determined that the printer indexing system persistently underfeeds media by 0.2 percent (the amount being stored in memory 306), then the feedroller should actually be moved by 1002 encoder counts.

Then, it can be determined which periodic compensation factor should be selected from table 300 by determining the location within a given rotation that the feedroller will end up after moving this distance. Based upon that ending rotational position, the periodic compensation factor can be selected and added to the command and indexing can then commence based upon that command. In the example of FIG. 11, if the feedroller were to stop at relative angular position 510 (i.e., at about the 510$^{th}$ encoder mark) after the 1002 encoder counts, then a periodic compensation factor of 946 (in fine adjustment units) could be added to the 1002 count command to reach a final position command count. If the fine adjustment units were in hundredths of encoder counts, then 946/100, or 9.46 counts could be added to the final command to reach a final count of 1011 counts, or if there were 256 fine units per encoder count, then 946/256 or 3.7 counts would be added to the final command to reach a final count of 1006 counts. This final command can then be utilized to move the feedroller the compensated amount. An illustrative control architecture for implementing media indexing control similar to this example will be described in further detail below.

Figure 12:
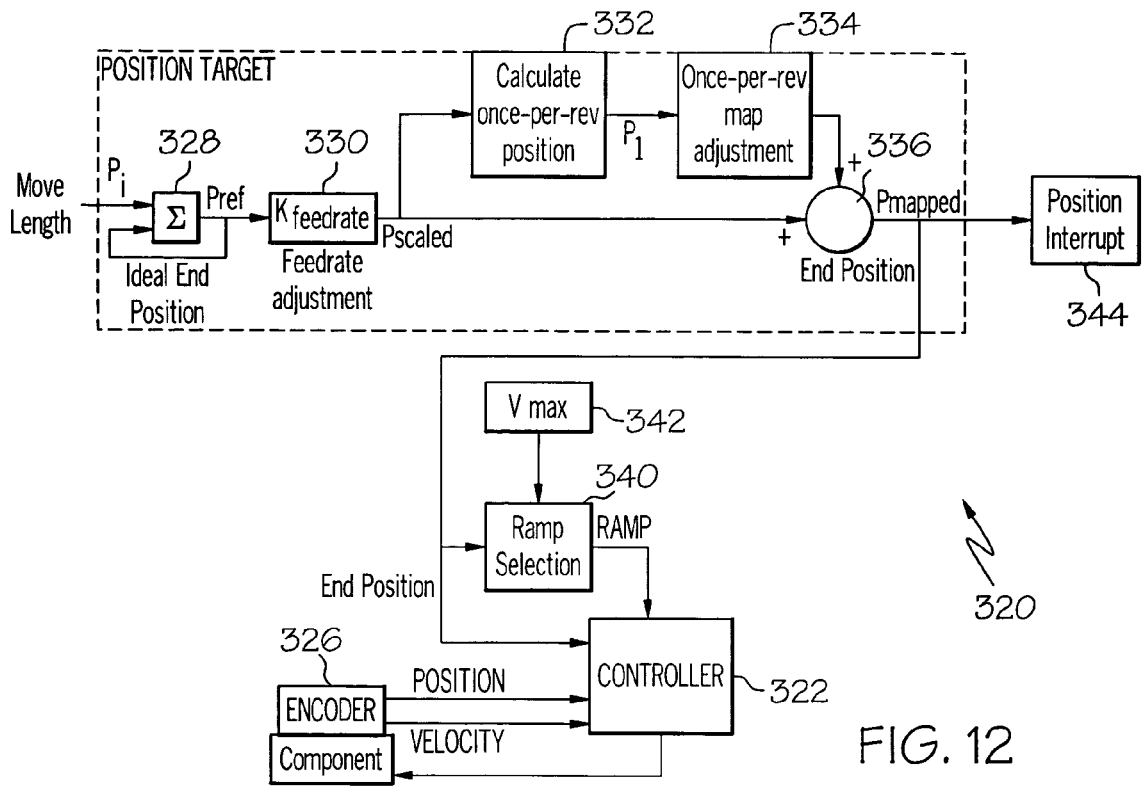
FIG. 12 is a functional block diagram representing the operation and components of an exemplary media indexing control system, made and operating according to principles of the present invention.

FIG. 12 is a block diagram illustrating an example of a printer media indexing control system that can utilize indexing compensation factors and which is made and operates according to principles of the present invention. In this example, the system 320 includes a controller 322 which controls the positioning of a media indexing component. An encoder 326 or other sensor provides feedback to the controller 322 during the control of the indexing of the media which are taken into account by an algorithm within the controller 322 during the media indexing control.

This illustrative embodiment of the control architecture includes compensation for the measured linear or cumulative media indexing error, as well as for the measured periodic or recurring media indexing error. In particular, in this embodiment, a position increment $P_i$ is provided that represents the length that the media needs to be indexed in order to position the media at the next printing location. In other words, $P_i$ represents the total amount that the media needs to be moved to position it at the next location where the print substance is applied. This amount can vary depending on where the next image data swath to be processed is to be location.

Figure 13:
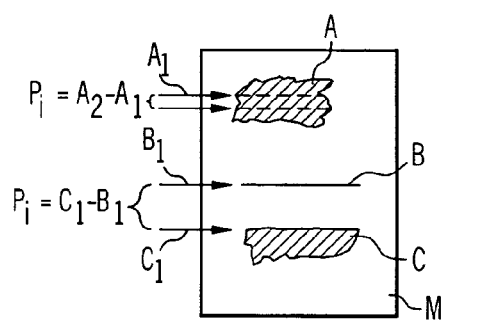
FIG. 13 is a schematic diagram illustrating various images on a sheet of media as well as compensated movement of the media to next printing locations during printing of such images, according to principles of the present inventions.

For instance, in the example of FIG. 13, images A, B, and C are to be printed on the media M. These images can represent graphics, text, or a combination of both. When the printer is in the middle of printing swaths of image A, the move distance $P_i$ may represent one swath height. For instance, if the printer just completed printing the swath at A1, it would need to index the media a small distance in order to print at the next location A2 for image A (i.e. $P_i$ would equal the distance to the next swath, A2–A1). On the other hand, if the printer had just finished printing image B at location B1, the media would need to be advanced a larger distance, and in particular the distance between locations C1 and B1 (C1–B1), which could entail multiple revolutions of the feedroller.

Accordingly, returning to FIG. 12, the distance $P_i$ represents the amount the media needs to be advanced in order to allow the printing substance to be applied at the next desired location on the media. This distance can be provided in units of lines per inch, in feedroller encoder count units, or in other appropriate units for the particular system being utilized. In order to convert the move distance to a corresponding position counter value, the distance $P_i$ can then be added to the last ideal (uncompensated) command in order to obtain the absolute position command ($P_{ref}$) to which the counter for the feedroller (or other component) should ideally be moved in order to obtain the desired amount of media indexing for printing at the next location. This addition is illustrated in the example at summation block 328.

Compensation can then be applied to this ideal ending position, because the system does not operate in an ideal manner. In this embodiment, a first compensation is applied at multiplication block 330, where the reference position $P_{ref}$ is multiplied by the feedrate compensation factor or gain $K_{feedrate}$ in order to arrive at a scaled position $P_{scaled}$. If no feedrate compensation is desired, the value of $K_{feedrate}$ can be set to 1. Moreover, if the indexing system overfeeds the media and less indexing is therefore desired, the value can be set to less than one (e.g., 0.998 if 2% more underfeed is desired), and if the indexing system underfeeds the media and more indexing is therefore desired, the value can be set to be greater than one (e.g., 1.002 if 2% less underfeed is desired). This value can be determined by a suitable calibration system and method, such as by the examples of such described herein.

In addition to the use of a linear compensation factor, a periodic compensation factor can also be applied to the media position movement. In this example, the adjustment is applied via a table or mapping method, although other calculations or compensation methods can be utilized. In particular, the scaled position $P_{scaled}$ is utilized to look up a corresponding periodic compensation factor from an error map or table, as illustrated at blocks 332 and 334. The scaled position $P_{scaled}$ can be utilized to determine the ending angular or rotational position of the encoder relative to a home position. This is depicted at block 332 where a once-per-revolution position is calculated.

One illustrative way to achieve this is to maintain a position counter that is reset each time a page is loaded (e.g., a piece of paper is picked) as well as to maintain a once-per-revolution counter that is reset when the encoder is initialized to the home position, such as at power-up of the printer. Since the position counter is reset after a page is loaded, the starting location of the once-per-revolution counter can be recorded in a variable $P_{start}$) at the time of the page load. This value ($P_{start}$) then corresponds to the location in the once-per-revolution counter that equates to zero in the position counter and can be kept in the desired movement units (e.g., in 2400ths). For instance, if the page was loaded at a time that the OPR counter had a reading of 9,995, then $P_{start}$ would have a value of 9,995, and the OPR counter would continue to be incremented with each incremental movement of the encoder. Using this information, the following equation can be utilized to determine the corresponding scaled position with respect to the once-per-revolution counter:

$$P_1 = (P_{scaled}/256 + P_{start}) \bmod(\max)$$

where max is the number of counts per revolution of the encoder, and the factor of 256 can be utilized to convert the fine resolution of $P_{scaled}$ to the coarser resolution of $P_{start}$.

Utilizing the modulus or remainder function with respect to the maximum number of counts per revolution, this formula for this illustrative embodiment provides the location where the encoder should wind up or stop after the feedroller is moved the scaled position amount ($P_{scaled}$). The modulus function allows the formula to obtain the number of counts past the home position that the encoder will be located if a movement to the scaled position were conducted.

Figure 14:
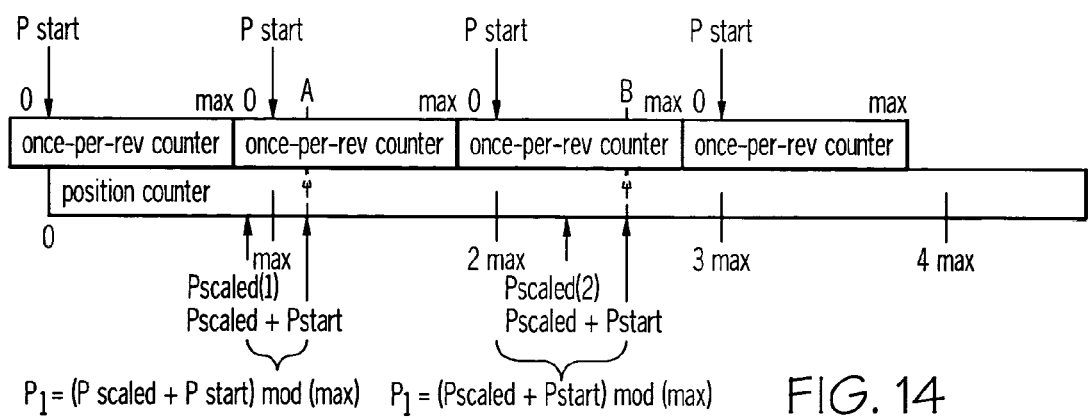
FIG. 14 is a diagram illustrating the alignment of a once-per-revolution counter with a per-page position counter according to principles of the present invention.

FIG. 14 provides a graphical representation of this calculation that is utilized for this illustrative embodiment. Here, the exemplary system utilizes two counters, a position counter that counts each incremental movement of the encoder and is reset whenever a new page is loaded, and a once-per-revolution counter that is reset at the time that the encoder is initialized to its home position (e.g., at power-up of the printer). Accordingly, the two counters are not in synchronization, and the calculation of $P_1$ allows for the determination of the location between 0 and max on the once-per-revolution counter that the $P_{scaled}$ position would be located if the feedroller were moved to that position. (The value "max" is the maximum count value that the once-per-revolution counter can reach before cycling back to zero and continuing counting from there.) For instance, if the printer were to be commanded to move to the scaled position $P_{scaled}(1)$ relative to the position counter, the $P_{start}$ value can be added to that amount and the modulus function then indicates that the once-per-revolution counter would wind up at position A, which is about ⅓ of the way between 0 and max on the once-per-revolution counter. In other words, if the indexing system were moved an amount corresponding to the position command $P_{scaled}(1)$, the encoder would wind up about ⅓ of the way from the home position after one full revolution.

FIG. 14 illustrates another example where the position command $P_{scaled}(2)$ is much larger than in the first example. Here, after adding this value to $P_{start}$ and performing the $P_1$ calculation, it is determined that the once-per-revolution counter would wind up at position B, which is about ¾ of the way between 0 and max on the OPR counter. In other words, if the indexing system were moved an amount corresponding to the position command $P_{scaled}(2)$, the encoder would wind up about ¾ from the home position after two full revolutions.

Turning again to FIG. 12, once the ending position with respect to the once-per-revolution counter is known from block 332, this value can be used as an input to the once-per-revolution compensation map to obtain the factor to be applied to the scaled position reference ($P_{scaled}$), in order to compensate for the periodically recurring (e.g., angular-position-dependent) errors, as illustrated at block 334 in the example of FIG. 12. In this example, the value $P_1$ is used as the input to a once-per-revolution map or table obtained from a calibration method in order to obtain the position adjustment to the scaled position reference $P_{scaled}$. In some embodiments, the input position ($P_1$) may be in 2400ths, but the output adjustment value may include 8 bits of fine position adjustment along with several coarse position bits, including a sign for the value. The map can include any appropriate number of entries (e.g., 16 distinct points), and interpolation (e.g., linear interpolation) may be utilized for input positions not exactly matching entries within the map.

Figure 15:
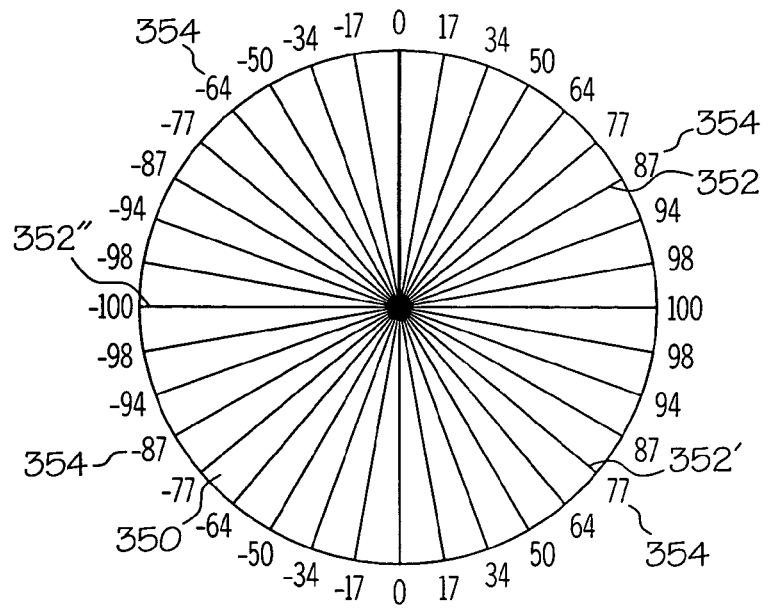
FIG. 15 is a schematic diagram showing an illustrative rotating printer component having compensation factors mapped to various angular positions on the component according to principles of the present invention.

FIG. 15 is an illustrative schematic diagram of an encoder 350 or other indexing system component where various compensation factors 354 are mapped to various rotational positions 352 of the encoder 350. In this example, the factors vary sinusoidally according to the angular position of the encoder 350 and have a maximum value (amplitude) of 100. For instance, if it were determined that the encoder 350 were to stop at position 352' for the next printing location of the image being printed, then the compensation to be applied to the command for making that movement would be +77. As another example, if it were determined that the encoder 350 were to stop at position 352" for the next printing swath of the image being printed, then the compensation to be applied to the command for making that movement would be −100.

With reference again to FIG. 12, after the compensation factor is obtained utilizing the map, it can be added to the scaled position $P_{scaled}$ at summation node 336 to obtain the final compensated indexing command $P_{mapped}$. This final indexing command is therefore an adjustment of the ideal indexing command for moving the next printing location on the media adjacent the printing element (e.g., print head). The controller 322 can then utilize the final indexing command $P_{mapped}$, along with feedback from the encoder 326, to move the indexing system component so that the next printing location on the media arrives adjacent the printing element. Accordingly, in this embodiment, compensation is applied only once per indexing of the media by the desired amount to the next printing location for the image being printed, rather than as a continual adjustment based upon feedback or other controller commands. In this manner, the requirements of the control circuitry utilized can be reduced.

The controller 322 can comprise any suitable control circuitry, such as an integrated circuit for example, and the other control system blocks of FIG. 12 can be implemented as instructions, code, or steps executed by this circuitry or separate circuitry. Additional control components can also be provided if desired. For example, a ramp selection process 340 can be employed during the positioning control to ensure that the indexing component does not exceed a desired velocity 342 during the movement. Likewise, a position interrupt block 344 can be provided so that the position controller 322 is shut down after the desired position is reached. Accordingly, many alternatives to the example shown are possible.

In addition, the embodiment of FIG. 12 can be utilized with various modifications. For example, during printing operations, if it is determined that the home position detector is not correctly determining the location of the home position mark or has otherwise failed, then it can be desirable to disable the position based error mapping of blocks 332 and 334. This can be achieved by using a decision block before executing the steps 332 and 334, the decision block determining whether the home position detector has provided a valid signal within a certain time frame or within a certain amount of movement. This could also be achieved by multiplying the once-per-revolution compensation factor by zero if the home position counter indicates an error condition. Accordingly, in such situations, the final indexing command could be equal to $P_{scaled}$, or if the feedrate compensation is also disabled, to $P_{ref}$.

Alternatively, the scaling factor applied at block 330 can be adjusted to compensate for the disabling of the once-per-revolution compensation blocks. For example, the feedrate compensation amount could be adjusted based upon the amplitude of the periodic error to ensure that the once-per-revolution errors do not exceed desired amounts. For instance, if the maximum amplitude of the periodic error can cause the error to enter an overfeed situation, then the feedrate compensation can be adjusted by a corresponding amount to prevent such a situation.

As can be understood, the modules of FIG. 12, as well as other modules and components described herein, can be implemented using software, firmware, and/or hardware circuitry. For instance, the various functionalities described can be programmed as a series of instructions, code, or commands using general purpose or special purpose programming languages, and can be executed on one or more processors or other control circuitry.

As described above, various embodiments described herein utilize a count or pointer indicating the position of a component relative to the home position. Therefore, it can be beneficial in certain embodiments to periodically verify that this counter or locator is providing an accurate indication of where the component is relative to the home position. This can be particularly true for embodiments, such as that of FIG. 12, that utilize a counter that is reset at infrequent times based upon a home position detector, but which then subsequently counts based upon pulses from an incremental mark detector.

Figure 16:
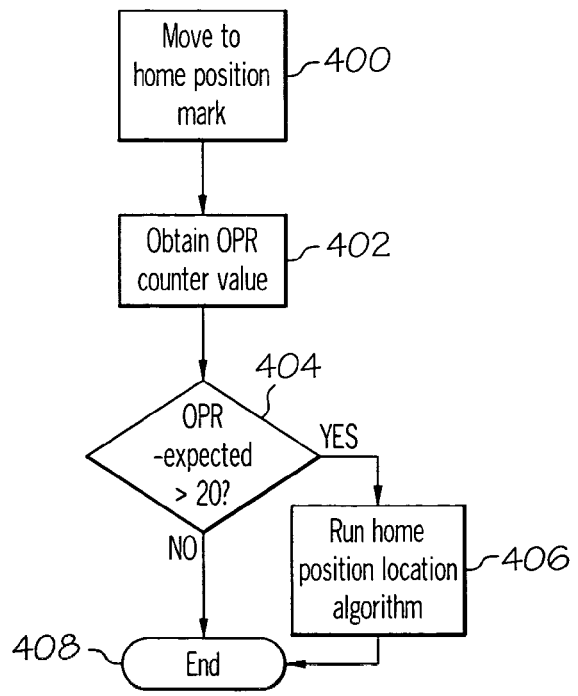
FIG. 16 is a flow diagram depicting an illustrative method of verifying the accuracy of a once-per-revolution counter according to principles of the present invention.

FIG. 16 is a flow diagram depicting an illustrative method of periodically verifying that the counter or pointer is correctly indicating the home position. In this embodiment, the component (e.g., feedroller) is moved to the location where the home position detector is indicating a mark is present and therefore that the home position is reached. This step is shown at block 400. The value in the once-per-revolution (OPR) counter (the counter that was reset after a home position location algorithm) is then obtained, as shown at block 402. The value of the OPR counter is then compared to an expected value and it is determined whether the difference between the two exceeds a predetermined number of counts, as shown at step 404. In this example, the predetermined number is twenty. The expected value can be based upon the number of incremental marks per revolution of the encoder. For example, for an encoder having 1000 incremental marks or counts per revolution, it would be expected that the OPR counter is a multiple of 1000 (e.g., 1000, 2000, 3000 . . . ) whenever the home position detector indicates that the home position is reached. Likewise, if the OPR counter resets to zero after reaching a maximum number corresponding to the maximum number of incremental marks, then the OPR counter should be approximately zero whenever the home position mark is reached.

If the OPR counter exceeds the expected count by greater than the predetermined number, then the counter should be readjusted because it is not providing accurate data. Accordingly, as shown at block 406, a home position location algorithm can be run that moves the encoder to the home position mark and then resets the OPR counter. For example, the algorithm of FIG. 5 or other appropriate algorithm could be utilized. If the OPR counter does not differ significantly from the expected value, then the process can be ended, as shown at block 408, and no resetting of the counter is conducted. The illustrative method of FIG. 16 can be run periodically to update the accuracy of the OPR counter, such as during a pause in printing activity or at other desired times.

The foregoing description of the illustrative embodiments has been presented for purposes of illustration and description of the various principles of the inventions. It is not intended to be exhaustive or to limit the invention to the precise form disclosed and modifications and variations are possible in light of the above teachings. For example, although a number of steps, materials, and components have been described for use in the illustrative embodiments, it is to be understood that additional or alternative steps, materials and components could be used without departing from the scope of the inventions. Moreover, although various aspects of the inventions have been illustrated, these aspects need not be utilized in combination.

Therefore, it should be understood that the embodiments were chosen and described in order to best illustrate the principles of the inventions and their possible practical applications. This illustration was also provided to thereby enable one of ordinary skill in the art to utilize the inventions in various embodiments and with various modifications as are suited for the particular use contemplated. Accordingly, it is intended that the scope of the inventions be defined by the claims appended hereto.

What is claimed is:

1. A method for determining a threshold level and locating a home position of a rotatable element, the method comprising:
    rotating the rotatable element and an encoder disk coupled to the rotatable element;
    during the rotation, monitoring signals from a home position detector configured to detect a home position location on the encoder disk, wherein the signals from the home position detector have varying levels during the rotation;
    automatically determining a threshold level based upon the varying levels of the signals monitored from the home position detector during the rotation, wherein the threshold level represents the signal level upon which the home position detector bases its determination of when the home position location is reached; and
    identifying when the level of the home position detector signals reaches the threshold level.

2. The method as recited in claim 1, wherein the threshold level is determined by adding a ratio of a minimum of the home position detector signal received during the rotation plus a ratio of a maximum of the home position detector signal received during the rotation.

3. The method as recited in claim 1, wherein the rotation continues until the encoder disk has completed greater than one revolution.

4. The method as recited in claim 1, further comprising:
scanning the home position signals during the rotation to determine maximum and minimum home position signals, wherein the threshold level is determined based upon the maximum and minimum home position signals.

5. The method as recited in claim 1, wherein the threshold level is determined during a first state transition of the home position signal, and wherein the method further comprises:
stopping the rotation once the home position signal reaches the threshold during a second state transition of the home position signal.

6. The method as recited in claim 5, wherein the first state transition is a transition from a low state to a high state and the second state transition is a return transition from the high state to the low state.

7. The method as recited in claim 1, wherein a counter is set after the rotation is complete.

8. The method as recited in claim 1, wherein a counter is set once the home position signal reaches the threshold level.

9. The method as recited in claim 1, wherein the rotation comprises an initial rotation, and wherein the method further comprises:
after the threshold level is determined, conducting a subsequent rotation of the rotatable element, wherein a counter is set during the subsequent rotation.

10. A method for determining a threshold level and locating a home position of a rotatable element in a printing device, the method comprising;
rotating the rotatable element in the printing device and an encoder disk coupled to the rotatable element;
during the rotation, monitoring signals from a home position detector configured to detect a home position location on the encoder disk;
during the rotation, determining maximum and minimum values of the home position detector signals by analyzing a plurality of signals received from the home position detector during the rotation and determining which of said plurality of signals is the maximum and which of said plurality of signals is the minimum;
automatically determining a threshold level based upon the maximum and minimum values that are determined wherein the threshold level is automatically determined after a first state transition of the home position signal and during a second state transition of the home position signal, wherein the first state transition comprises a change over time of the monitored signals between two states and wherein the second state transition follows the first state transition and comprises an opposing change over time of the signals between the two states; and
identifying when the home position signal reaches the threshold during the second state transition of the home position signal.

11. The method as recited in claim 10, further comprising:
stopping the element once the home position signal reaches the threshold during the second state transition of the home position signal.

12. The method as recited in claim 10, wherein the first state transition is a transition from a low state to a high state and the second state transition is a subsequent return transition from the high state to the low state.

13. The method as recited in claim 10, wherein a counter is set by saving a count value when the home position signal reaches the threshold level.

14. The method as recited in claim 10, wherein a counter is set retroactively after the home position signal has already past the threshold level.

* * * * *